(12) United States Patent
MacKinnon et al.

(10) Patent No.: US 8,117,639 B2
(45) Date of Patent: *Feb. 14, 2012

(54) SYSTEM AND METHOD FOR PROVIDING ACCESS CONTROL

(75) Inventors: Richard MacKinnon, Austin, TX (US); Kelly Looney, Austin, TX (US); Eric White, Austin, TX (US)

(73) Assignee: Rocksteady Technologies, LLC, Austin, TX (US)

( * ) Notice: Subject to any disclaimer, the term of this patent is extended or adjusted under 35 U.S.C. 154(b) by 1167 days.

This patent is subject to a terminal disclaimer.

(21) Appl. No.: 10/683,317

(22) Filed: Oct. 10, 2003
(Under 37 CFR 1.47)

(65) Prior Publication Data

US 2004/0177276 A1    Sep. 9, 2004

Related U.S. Application Data

(60) Provisional application No. 60/417,674, filed on Oct. 10, 2002.

(51) Int. Cl.
*H04L 29/06* (2006.01)
(52) U.S. Cl. ............... 726/1; 713/156; 726/13; 726/27
(58) Field of Classification Search ............... 713/150, 713/1, 151, 153, 155, 156, 160, 161, 162, 713/164, 168, 172, 182, 189; 726/5, 1, 2, 726/19, 27, 11, 12, 13; 705/26, 27
See application file for complete search history.

(56) References Cited

U.S. PATENT DOCUMENTS

| | | | |
|---|---|---|---|
| 5,623,601 A |   | 4/1997 | Vu |
| 5,673,393 A |   | 9/1997 | Marshall et al. |
| 5,706,427 A |   | 1/1998 | Tabuki |
| 5,748,901 A |   | 5/1998 | Afek et al. |
| 5,835,727 A | * | 11/1998 | Wong et al. ............... 709/238 |
| 5,878,231 A |   | 3/1999 | Baehr et al. |
| 5,896,499 A | * | 4/1999 | McKelvey ............... 726/11 |
| 5,901,148 A |   | 5/1999 | Bowen et al. |

(Continued)

FOREIGN PATENT DOCUMENTS

EP    0587522 B1    1/2000

(Continued)

OTHER PUBLICATIONS

Pending U.S. Appl. No. 09/458,602, Pagan et al.

(Continued)

*Primary Examiner* — David García Cervetti
(74) *Attorney, Agent, or Firm* — Sprinkle IP Law Group

(57) ABSTRACT

Embodiments disclosed herein provide systems and methods for provisioning network access for a user in order to provide access control to one or more networks with regard to the user. More particularly, a user may be authenticated and, based on a user profile associated with the authenticated user, provisioning rules may be established for the user such that the user's network access to one or more networks may be controlled based upon the user profile associated with the user. In a network utilized by multiple users, the use of access control based on user profiles associated with the users may prevent any one user or users from accessing one or more networks to the exclusion or detriment of other users because each user may be limited to the network resources provisioned to that user based on the user profile associated with the user.

27 Claims, 8 Drawing Sheets

U.S. PATENT DOCUMENTS

| | | | |
|---|---|---|---|
| 5,936,542 A | 8/1999 | Kleinrock et al. | |
| 5,953,506 A | 9/1999 | Kalra et al. | |
| 5,987,134 A | 11/1999 | Shin et al. | |
| 5,996,013 A | 11/1999 | Delp et al. | |
| 6,085,241 A | 7/2000 | Otis | |
| 6,088,451 A | 7/2000 | He et al. | |
| 6,092,200 A | 7/2000 | Muniyappa et al. | |
| 6,108,782 A | 8/2000 | Fletcher et al. | |
| 6,130,892 A | 10/2000 | Short et al. | |
| 6,131,116 A | 10/2000 | Riggins et al. | |
| 6,157,953 A | 12/2000 | Chang et al. | |
| 6,173,331 B1 | 1/2001 | Shimonishi | |
| 6,176,883 B1 | 1/2001 | Holloway et al. | |
| 6,185,567 B1 | 2/2001 | Ratnaraj et al. | |
| 6,194,992 B1 | 2/2001 | Short et al. | |
| 6,199,113 B1 | 3/2001 | Alegre et al. | |
| 6,205,552 B1 | 3/2001 | Fudge | |
| 6,212,558 B1 | 4/2001 | Antur et al. | |
| 6,219,706 B1 | 4/2001 | Fan et al. | |
| 6,226,752 B1 * | 5/2001 | Gupta et al. | 726/9 |
| 6,233,607 B1 | 5/2001 | Taylor et al. | |
| 6,243,815 B1 | 6/2001 | Antur et al. | |
| 6,266,774 B1 | 7/2001 | Sampath et al. | |
| 6,275,693 B1 | 8/2001 | Lin et al. | |
| 6,295,294 B1 | 9/2001 | Odlyzko | |
| 6,321,339 B1 | 11/2001 | French et al. | |
| 6,324,648 B1 | 11/2001 | Grantges, Jr. | |
| 6,336,133 B1 | 1/2002 | Morris et al. | |
| 6,404,743 B1 | 6/2002 | Meandzija | |
| 6,421,319 B1 | 7/2002 | Iwasaki | |
| 6,463,474 B1 * | 10/2002 | Fuh et al. | 709/225 |
| 6,473,793 B1 | 10/2002 | Dillon et al. | |
| 6,473,801 B1 | 10/2002 | Basel | |
| 6,477,143 B1 | 11/2002 | Ginossar | |
| 6,502,131 B1 * | 12/2002 | Vaid et al. | 709/224 |
| 6,502,135 B1 | 12/2002 | Munger et al. | |
| 6,516,417 B1 | 2/2003 | Pegrum et al. | |
| 6,535,879 B1 | 3/2003 | Behera | |
| 6,539,431 B1 | 3/2003 | Sitaraman et al. | |
| 6,631,416 B2 * | 10/2003 | Bendinelli et al. | 709/227 |
| 6,636,894 B1 * | 10/2003 | Short et al. | 709/225 |
| 6,643,260 B1 * | 11/2003 | Kloth et al. | 370/235 |
| 6,678,733 B1 | 1/2004 | Brown et al. | |
| 6,708,212 B2 | 3/2004 | Porras et al. | |
| 6,732,179 B1 | 5/2004 | Brown et al. | |
| 6,735,691 B1 | 5/2004 | Capps et al. | |
| 6,757,740 B1 | 6/2004 | Parekh et al. | |
| 6,763,468 B2 * | 7/2004 | Gupta et al. | 726/2 |
| 6,785,252 B1 | 8/2004 | Zimmerman et al. | |
| 6,789,110 B1 | 9/2004 | Short et al. | |
| 6,789,118 B1 * | 9/2004 | Rao | 709/225 |
| 6,798,746 B1 * | 9/2004 | Kloth et al. | 370/235 |
| 6,804,783 B1 * | 10/2004 | Wesinger et al. | 726/11 |
| 6,816,903 B1 * | 11/2004 | Rakoshitz et al. | 709/226 |
| 6,823,385 B2 | 11/2004 | McKinnon et al. | |
| 6,834,341 B1 * | 12/2004 | Bahl et al. | 713/156 |
| 6,839,759 B2 | 1/2005 | Larson et al. | |
| 6,876,668 B1 * | 4/2005 | Chawla et al. | 370/468 |
| 6,907,530 B2 | 6/2005 | Wang | |
| 6,917,622 B2 | 7/2005 | McKinnon et al. | |
| 6,976,089 B2 * | 12/2005 | Na et al. | 709/242 |
| 6,996,625 B2 | 2/2006 | Kaplan et al. | |
| 7,013,331 B2 | 3/2006 | Das | |
| 7,085,385 B2 | 8/2006 | Frantz et al. | |
| 7,085,854 B2 * | 8/2006 | Keane et al. | 709/250 |
| 7,092,727 B1 * | 8/2006 | Li et al. | 455/466 |
| 7,120,934 B2 | 10/2006 | Ishikawa | |
| 7,143,283 B1 | 11/2006 | Chen et al. | |
| 7,143,435 B1 * | 11/2006 | Droms et al. | 726/3 |
| 7,146,639 B2 | 12/2006 | Bartal et al. | |
| 7,181,017 B1 * | 2/2007 | Nagel et al. | 380/282 |
| 7,181,542 B2 * | 2/2007 | Tuomenoksa et al. | 709/227 |
| 7,181,766 B2 * | 2/2007 | Bendinelli et al. | 726/15 |
| 7,185,073 B1 * | 2/2007 | Gai et al. | 709/221 |
| 7,185,358 B1 | 2/2007 | Schreiber et al. | |
| 7,185,368 B2 | 2/2007 | Copeland, III | |
| 7,188,180 B2 | 3/2007 | Larson et al. | |
| 7,194,554 B1 * | 3/2007 | Short et al. | 709/246 |
| 7,257,833 B1 * | 8/2007 | Parekh et al. | 726/1 |
| 7,266,754 B2 | 9/2007 | Shah et al. | |
| 7,272,646 B2 | 9/2007 | Cooper et al. | |
| 7,290,288 B2 * | 10/2007 | Gregg et al. | 726/28 |
| 7,310,613 B2 | 12/2007 | Briel et al. | |
| 7,316,029 B1 * | 1/2008 | Parker et al. | 726/13 |
| 7,324,551 B1 * | 1/2008 | Stammers | 370/468 |
| 7,324,947 B2 | 1/2008 | Jordan et al. | |
| 7,325,042 B1 | 1/2008 | Soscia et al. | |
| 7,386,888 B2 | 6/2008 | Liang et al. | |
| 7,406,530 B2 | 7/2008 | Brown et al. | |
| 7,418,504 B2 | 8/2008 | Larson et al. | |
| 7,420,956 B2 | 9/2008 | Karaoguz et al. | |
| 7,444,669 B1 * | 10/2008 | Bahl et al. | 726/3 |
| 7,448,075 B2 * | 11/2008 | Morand et al. | 726/7 |
| 7,454,792 B2 | 11/2008 | Cantrell et al. | |
| 7,490,151 B2 | 2/2009 | Munger et al. | |
| 7,509,625 B2 | 3/2009 | Johnston et al. | |
| 7,587,512 B2 | 9/2009 | Ta et al. | |
| 7,590,728 B2 | 9/2009 | Tonnesen et al. | |
| 7,610,621 B2 | 10/2009 | Turley et al. | |
| 7,624,438 B2 | 11/2009 | White | |
| 7,665,130 B2 | 2/2010 | Johnston et al. | |
| 2001/0038639 A1 | 11/2001 | McKinnon et al. | |
| 2001/0038640 A1 | 11/2001 | McKinnon et al. | |
| 2001/0038645 A1 | 11/2001 | McKinnon et al. | |
| 2001/0039576 A1 | 11/2001 | Kanada | |
| 2001/0039582 A1 | 11/2001 | McKinnon et al. | |
| 2002/0011218 A1 | 1/2002 | Ford et al. | |
| 2002/0013844 A1 | 1/2002 | Garrett et al. | |
| 2002/0021665 A1 | 2/2002 | Bhagavath et al. | |
| 2002/0023160 A1 | 2/2002 | Garrett et al. | |
| 2002/0023210 A1 * | 2/2002 | Tuomenoksa et al. | 713/161 |
| 2002/0026503 A1 * | 2/2002 | Bendinelli et al. | 709/220 |
| 2002/0026531 A1 * | 2/2002 | Keane et al. | 709/250 |
| 2002/0029260 A1 | 3/2002 | Dobbins et al. | |
| 2002/0029276 A1 * | 3/2002 | Bendinelli et al. | 709/227 |
| 2002/0035699 A1 | 3/2002 | Crosbie | |
| 2002/0042883 A1 | 4/2002 | Roux et al. | |
| 2002/0046264 A1 | 4/2002 | Dillon et al. | |
| 2002/0052950 A1 | 5/2002 | Pillai et al. | |
| 2002/0053031 A1 * | 5/2002 | Bendinelli et al. | 713/201 |
| 2002/0055968 A1 | 5/2002 | Wishoff et al. | |
| 2002/0056008 A1 * | 5/2002 | Keane et al. | 709/245 |
| 2002/0059408 A1 | 5/2002 | Pattabhiraman et al. | |
| 2002/0075844 A1 * | 6/2002 | Hagen | 370/351 |
| 2002/0085719 A1 | 7/2002 | Crosbie | |
| 2002/0087713 A1 | 7/2002 | Cunningham | |
| 2002/0090089 A1 | 7/2002 | Branigan | |
| 2002/0091859 A1 * | 7/2002 | Tuomenoksa et al. | 709/245 |
| 2002/0091944 A1 | 7/2002 | Anderson et al. | |
| 2002/0099829 A1 * | 7/2002 | Richards et al. | 709/227 |
| 2002/0112183 A1 | 8/2002 | Baird, III et al. | |
| 2002/0120741 A1 | 8/2002 | Webb et al. | |
| 2002/0123335 A1 | 9/2002 | Luna et al. | |
| 2002/0124078 A1 | 9/2002 | Conrad | |
| 2002/0124103 A1 | 9/2002 | Maruyama et al. | |
| 2002/0129143 A1 | 9/2002 | McKinnon, III et al. | |
| 2002/0131404 A1 | 9/2002 | Mehta et al. | |
| 2002/0133581 A1 | 9/2002 | Schwartz et al. | |
| 2002/0133586 A1 | 9/2002 | Shanklin et al. | |
| 2002/0133589 A1 | 9/2002 | Gubbi et al. | |
| 2002/0136226 A1 | 9/2002 | Christoffel et al. | |
| 2002/0138631 A1 | 9/2002 | Friedel et al. | |
| 2002/0138762 A1 | 9/2002 | Horne | |
| 2002/0138763 A1 | 9/2002 | Delaney et al. | |
| 2002/0143964 A1 | 10/2002 | Guo et al. | |
| 2002/0152284 A1 | 10/2002 | Cambray et al. | |
| 2002/0162030 A1 | 10/2002 | Brezak et al. | |
| 2002/0164952 A1 | 11/2002 | Singhal et al. | |
| 2002/0165949 A1 * | 11/2002 | Na et al. | 709/223 |
| 2002/0165990 A1 | 11/2002 | Singhal et al. | |
| 2002/0169867 A1 | 11/2002 | Mann et al. | |
| 2002/0174227 A1 | 11/2002 | Hartsell et al. | |
| 2002/0178282 A1 | 11/2002 | Mysore et al. | |
| 2002/0199007 A1 | 12/2002 | Clayton et al. | |
| 2003/0041104 A1 | 2/2003 | Wingard et al. | |
| 2003/0043846 A1 | 3/2003 | Purpura et al. | |
| 2003/0046370 A1 | 3/2003 | Courtney | |

| | | | |
|---|---|---|---|
| 2003/0055994 A1 | 3/2003 | Herrmann et al. | |
| 2003/0059038 A1 | 3/2003 | Meyerson et al. | |
| 2003/0061506 A1 | 3/2003 | Cooper et al. | |
| 2003/0069955 A1* | 4/2003 | Gieseke et al. | 709/223 |
| 2003/0069956 A1 | 4/2003 | Gieske et al. | |
| 2003/0070170 A1 | 4/2003 | Lennon | |
| 2003/0078784 A1 | 4/2003 | Jordan et al. | |
| 2003/0087629 A1 | 5/2003 | Juitt et al. | |
| 2003/0110073 A1 | 6/2003 | Briel et al. | |
| 2003/0115247 A1* | 6/2003 | Simpson et al. | 709/200 |
| 2003/0123442 A1 | 7/2003 | Drucker et al. | |
| 2003/0126608 A1 | 7/2003 | Safadi et al. | |
| 2003/0135753 A1 | 7/2003 | Batra et al. | |
| 2003/0149751 A1 | 8/2003 | Bellinger et al. | |
| 2003/0154399 A1 | 8/2003 | Zuk et al. | |
| 2003/0159072 A1 | 8/2003 | Bellinger et al. | |
| 2003/0163603 A1 | 8/2003 | Fry et al. | |
| 2003/0172167 A1 | 9/2003 | Judge et al. | |
| 2003/0177477 A1 | 9/2003 | Fuchs | |
| 2003/0182420 A1* | 9/2003 | Jones et al. | 709/224 |
| 2003/0212800 A1* | 11/2003 | Jones et al. | 709/228 |
| 2003/0212900 A1 | 11/2003 | Liu et al. | |
| 2003/0217126 A1 | 11/2003 | Polcha et al. | |
| 2004/0015719 A1 | 1/2004 | Lee et al. | |
| 2004/0047356 A1 | 3/2004 | Bauer | |
| 2004/0049586 A1 | 3/2004 | Ocepek et al. | |
| 2004/0064351 A1* | 4/2004 | Mikurak | 705/7 |
| 2004/0064560 A1* | 4/2004 | Zhang et al. | 709/226 |
| 2004/0064836 A1 | 4/2004 | Ludvig et al. | |
| 2004/0073941 A1 | 4/2004 | Ludvig et al. | |
| 2004/0083295 A1* | 4/2004 | Amara et al. | 709/229 |
| 2004/0085906 A1 | 5/2004 | Ohtani et al. | |
| 2004/0093513 A1 | 5/2004 | Cantrell et al. | |
| 2004/0103426 A1 | 5/2004 | Ludvig et al. | |
| 2004/0107290 A1 | 6/2004 | Kaplan et al. | |
| 2004/0122956 A1 | 6/2004 | Myers et al. | |
| 2004/0172557 A1 | 9/2004 | Nakae et al. | |
| 2004/0179822 A1 | 9/2004 | Tsumagari et al. | |
| 2004/0181816 A1 | 9/2004 | Kim et al. | |
| 2004/0199635 A1* | 10/2004 | Ta et al. | 709/226 |
| 2004/0210633 A1 | 10/2004 | Brown et al. | |
| 2004/0215957 A1* | 10/2004 | Moineau et al. | 713/153 |
| 2004/0268149 A1 | 12/2004 | Aaron | |
| 2004/0268234 A1 | 12/2004 | Sampathkumar et al. | |
| 2005/0021686 A1 | 1/2005 | Jai et al. | |
| 2005/0021975 A1* | 1/2005 | Liu | 713/182 |
| 2005/0044350 A1 | 2/2005 | White | |
| 2005/0044422 A1 | 2/2005 | Cantrell et al. | |
| 2005/0066200 A1* | 3/2005 | Bahl et al. | 713/201 |
| 2005/0091303 A1 | 4/2005 | Suzuki | |
| 2005/0138358 A1* | 6/2005 | Bahl et al. | 713/155 |
| 2005/0138416 A1 | 6/2005 | Qian et al. | |
| 2005/0149721 A1 | 7/2005 | Lu et al. | |
| 2005/0193103 A1 | 9/2005 | Drabik | |
| 2005/0195854 A1 | 9/2005 | Agmon et al. | |
| 2005/0204022 A1 | 9/2005 | Johnston et al. | |
| 2005/0204031 A1 | 9/2005 | Johnston et al. | |
| 2005/0204050 A1 | 9/2005 | Turley et al. | |
| 2005/0204168 A1* | 9/2005 | Johnston et al. | 713/201 |
| 2005/0204169 A1 | 9/2005 | Tonnesen | |
| 2005/0204402 A1 | 9/2005 | Turley et al. | |
| 2006/0036723 A1 | 2/2006 | Yip et al. | |
| 2006/0168229 A1 | 7/2006 | Shim et al. | |
| 2006/0168454 A1* | 7/2006 | Venkatachary et al. | 713/182 |
| 2006/0173992 A1 | 8/2006 | Weber et al. | |
| 2006/0184618 A1 | 8/2006 | Kurup et al. | |
| 2007/0073718 A1 | 3/2007 | Ramer et al. | |
| 2007/0186113 A1 | 8/2007 | Cuberson et al. | |
| 2007/0208936 A1 | 9/2007 | Robles | |
| 2007/0268878 A1 | 11/2007 | Clements | |
| 2008/0066096 A1 | 3/2008 | Wollmershauser et al. | |
| 2008/0120661 A1 | 5/2008 | Ludvig et al. | |
| 2008/0147840 A1 | 6/2008 | Roelens et al. | |
| 2008/0276305 A1 | 11/2008 | Chan et al. | |
| 2010/0192213 A1 | 7/2010 | Ta et al. | |

FOREIGN PATENT DOCUMENTS

| | | |
|---|---|---|
| WO | WO 0177787 A2 | 10/2001 |
| WO | WO 0209458 A2 | 1/2002 |
| WO | WO 02/23825 A1 | 3/2002 |
| WO | WO 0241587 A3 | 5/2002 |
| WO | WO 02077820 A1 | 10/2002 |
| WO | WO 03021890 A1 | 3/2003 |
| WO | WO 03/098461 A1 | 5/2003 |
| WO | WO 2004/034229 A2 | 4/2004 |
| WO | WO 2004/036371 A2 | 4/2004 |
| WO | WO 2005/020035 A2 | 3/2005 |

OTHER PUBLICATIONS

Pending U.S. Appl. No. 09/541,877, Short et al.
Pending U.S. Appl. No. 09/458,569, Short et al.
Pending U.S. Appl. No. 08/816,174, Short et al.
Lingblom, "Granite Develops SMB Stategy", CRN, San Jose, CA, Jun. 23, 2003.
"Boingo Wireless Service Installed At LaGuardia Airport" Copyright 2003 M2Communications Ltd., found at www.findarticles.com, 1 page, printed Dec. 8, 2003.
"West Point Unwired: the Military Academy at West Point Continues to Lead the Way in High-Tech Curriculum with Wireless Classroom Networking" Copyright 2003 M2Communications Ltd., found at www.findarticles.com, 1 page, printed Dec. 8, 2003.
Molta, "Wireless Hotspots Heat Up", Mobile & Wireless Technology feature, pp. 1-8, Copyright 2003 M2Communications Ltd., found at www.networkcomputing.com, printed Dec. 8, 2003.
Jackson, "Wireless at West Point: Officers of the Future Use IT in Class Now, in the Field Later (technology Report)" pp. 1-3, www.gcn.com, Apr. 21, 2003.
Lingblom, "Bluesocket's New Gateway Based on Open Standards—WGX-4000 Switch Wireless Gateway" CRN, Burlington, MA, found at www.crn.channelsupersearch.com, Apr. 21, 2003.
Dornan, "Wireless LANs: Freedom vs. Security?" Network Magazine, pp. 36-39, Jul. 2003.
O'Shea, "PCTEL looks past patent suite toward fusion of Wi-Fi, PC" Telephony.online, pp. 1-2, found at www.telephonyonline.com, Jun. 2, 2003.
O'Shea, "Boingo to Launch Initiative Aimed at Carrier Market" Telephony.online, 1 page, found at www.telephonyonline.com, Mar. 10, 2003.
International Search Report PCT/US03/32268, Oct. 29, 2004.
U.S. Patent Office Official Action issued Jan. 25, 2008 in U.S. Appl. No. 11/076,652, Steven D. Tonnesen, Jan. 25, 2008.
U.S. Patent Office Official Action issued Apr. 17, 2008, in U.S. Appl. No. 10/687,002, Tuan Ta, 13 pages.
U.S. Patent Office Official Action issued Jul. 13, 2007 in U.S. Appl. No. 10/922,041, Eric White.
U.S. Patent Office Official Action issued Oct. 18, 2007 in U.S. Appl. No. 10/687,002, Tuan Ta.
U.S. Patent Office Official Action issued Oct. 31, 2007 in U.S. Appl. No. 11/078,223, Keith Johnston.
Office Action issued in U.S. Appl. No. 11/076,652 dated Dec. 11, 2008, Tonnesen, 8 pages.
Office Action issued in U.S. Appl. No. 10/687,002 dated Jan. 7, 2009, Ta, 4 pages.
U.S. Patent Office Action issued Jul. 9, 2008, in U.S. Appl. No. 11/076,672, Keith Johnston, 12 pages.
U.S. Appl. No. 09/821,565, Ishikawa.
U.S. Appl. No. 09/881,147, Cooper et al.
U.S. Appl. No. 10/000,396, Copeland.
U.S. Appl. No. 10/072,683, Zuk et al.
U.S. Appl. No. 10/195,326, Lee et al.
U.S. Appl. No. 10/236,402, Bauer.
U.S. Appl. No. 10/291,095, Cantrell et al.
U.S. Appl. No. 10/469,206, Ohtani et al.
U.S. Appl. No. 10/641,494, Valluri.
U.S. Appl. No. 10/643,864, Nakae et al.
U.S. Appl. No. 10/709,423, Lu et al.
U.S. Appl. No. 10/930,392, Cantrell et al.
U.S. Appl. No. 10/930,922, Cantrell et al.
U.S. Appl. No. 10/953,326, Suzuki.
Fan et al, "Distributed Real Time Intrusion Detection System for 3G", 2004, pp. 1566-1570.

Yu et al., "Fuzzy Logic Based Adaptive Congestion Control Scheme for High-Speed Network", Aug. 2004, pp. 389-393.
Hamano et al., A Redirections-Based Defense Mechanism Against Flood-Type Attacks in Large Scale ISP Networks, 2004, pp. 543-547.
Sarolahti, "Congestion Control on Spurious TCP Retransmssion Timeouts," 2003, pp. 682-686.
Estevez-Tapiador et al., "Measuring Normality in HTTP Traffic for Anomaly-Based Intrusion Detection", Jun. 6, 2004, pp. 175-193.
Xing et al., "A Survey of Computer Vulnerability Assessment", Jan. 2004, pp. 1-11.
Wen et al. "Development of a Snort-Based Security Network Management and Real-Time Intrusion Detection System", Feb. 2004, pp. 40-43.
Thottethodi et al., "Exploiting Global Knowledge to Achieve Self-Tuned Congestion Control for K-ary n-cube Networks", Mar. 2004, pp. 257-272.
Trabelsi et al., "Malicious Sniffing Systems Detection Platform", 2004, pp. 201-207.
Guangzhi et al., "A Framework for Network Vulnerability Analysis", 2002, pp. 289-294.
Albuquerque et al., "Network Border Patrol: Preventing Congestion Collapse and Promoting Fairness in the Internet", Feb. 2004, pp. 173-186.
Wirbel, Loring, "Security Stampede Could Flatten IPSec", Jan. 2004, p. 12.
MacLeod, Calum, "Freeing the Shackles with Secure Remote Working", 2003, pp. 66-67.
Fisher, D., "SSL Simplifies VPN Security", Nov. 10, 2003, p. 40.
Conry-Murray, A., "SSL VPNs: Remote Access for the Masses", Oct. 2003, pp. 26-32.
Permeo Supports Microsoft Network Access Protection for Simplified Secure Remote Access; Permeo's Base5 Support for Microsoft Tech. Provides "Zero Touch" Policy Enforcement.
No author, Permeo Drives Out Operational Costs, Simplifies Secure Remote Access, Mar. 28, 2005, pp. NA.
No author, Netilla Lauches SSL VPN for Citrix. (Industry Briefs) (Virtual Private Networks) (Brief Article), Sep. 20, 2004, p. 43.
No author, "Secure Remote Access (Network Security) (VPN Gateway 4400 Series) (Brief Article)", Mar. 1, 2004, p. 50.
International Search Report and Written Opinion for related International Application No. PCT/US04/29249, Dec. 15, 2005.
Stone, David, "Securing Wireless LANs with VPN," May 2006, pp. NA.
Hamzeh, et al., "Point-to-Point Tunneling Protocol—PPTP RFC 2637" Network Working Group, Jul. 1999, pp. 1-54.
Pfleeger, Charles P., Security in Computing, PTR Prentice-Hall, Inc., 1989, Ch. 10.
International Search Report for PCT/US03/32912, Apr. 8, 2004.
Lingblom, "Bluesocket's New Gateway Based on Open Standards—WGX-4000 Switch Wireless Gateway" CRN, Burlington, MA at www.crn.channelsupersearch.com, Apr. 21, 2003.
U.S. Patent Office Action issued Jul. 22, 2008, in U.S. Appl. No. 11/076,652, Steven D. Tonnesen, 8 pages.
Office Action issued in U.S. Appl. No. 11/076,719, dated Sep. 4, 2008, Turley, 7 pages.
U.S. Patent Office Action issued Aug. 13, 2008, in U.S. Appl. No. 11/076,591, Patrick Turley, 10 pages.
SBC Technology Resources, Inc., XNMP-XML Network Management Protocol and Interface, Jul. 19, 2002, pp. 1-9, http://www.ietf.org/proceedings/02jul/slides.
Shim, Choon B., XNMP for IP Telephony Management, Enterprise Networks & Servers, Jun. 2006, pp. 1-7, http://www.enterprisenetworksandservers.com.
Oh et al., Interaction Translation Methods for XML/SNMP Gateway, Jul. 11, 2003, retrieved from . . . http://web-archive.org/web/20030711162412/http://dpnm.postech.ac.kr/papers/DSOM/02/xml-snmp-gateway/xml-snmp-gateway.pdf, pp. 1-5.
Office Action issued in U.S. Appl. No. 11/076,672 dated Feb. 3, 2009, Johnston, 10 pages.
Office Action issued in U.S. Appl. No. 11/076,591 dated Feb. 13, 2009, Turley, 26 pages.
International Preliminary Report on Patentability in PCT/US03/032268 dated Apr. 10, 2005, 3 pages.
International Preliminary Report on Patentability in PCT/US03/032912 dated Apr. 16, 2005, 3 pages.
International Preliminary Report on Patentability and Written Opinion in PCT/US04/029249 dated Feb. 21, 2006, 6 pages.
Office Action issued in U.S. Appl. No. 11/076,719 dated Mar. 17, 2009, 8 pages.
"Netilla Lauches Secure Gateway Appliance Family of Application . . .", PR Newswire, Sep. 13, 2004, Somerset, NJ, 3 pages.
"Fortinet and Aventail Deliver Joint Solution for Clientless Remote . . .", PR Newswire, Jan. 5, 2004, Seattle/Sunnyvale, CA, 3 pages.
"Cisco targets SSL VPN Vendors, adds support for clientless security . . .", Computerworld, vol. 37, No. 46, Nov. 17, 2003, 3 pages.
Office Action issued in U.S. Appl. No. 10/922,041, mailed Dec. 6, 2005, White, 10 pages.
Office Action issued in U.S. Appl. No. 10/922,041, mailed Mar. 30, 2006, White, 18 pages.
Office Action issued in U.S. Appl. No. 10/922,041, mailed Aug. 11, 2006, White, 19 pages.
Office Action issued in U.S. Appl. No. 10/922,041, mailed Jan. 30, 2007, White, 20 pages.
Office Action issued in U.S. Appl. No. 10/687,002, mailed May 2, 2007, Ta, 10 pages.
U.S. Patent and Trademark Office, Office Action issued in U.S. Appl. No. 10/922,041, mailed May 8, 2009, White, 13 Pages.
U.S. Patent and Trademark Office, Office Action issued in U.S. Appl. No. 11/076,672, mailed Jul. 21, 2009, White, 11 Pages.
Crandell et al., "A Secure and Transparent Firewall Web Proxy," Oct. 2003, USENIX, Retrieved from the internet on Jul. 15, 2009: <URL: http://www.usenix.org/event/lisa03/tech/full_papers/crandell/crandell.pdf>.
Sommerlad, "Reverse Proxy Patterns," 2003 Retrieved from the Internet on Jul. 15, 2009: <URL: http://www.modsecurity.org/archive/ReverseProxy-book-1.pdf>.
U.S. Patent and Trademark Office, Notice of Allowability issued in U.S. Appl. No. 11/076,646, mailed Jul. 24, 2009, Johnston et al., 7 pages.
Office Action issued in U.S. Appl. No. 11/076,672, mailed Jan. 7, 2010, 9 pgs.
Office Action issued in U.S. Appl. No. 11/076,591, mailed Feb. 2, 2010, 34 pgs.
Office Action issued in U.S. Appl. No. 11/076,591, mailed Aug. 6, 2009, 29 pages.
Rashti et al, "A Multi-Dimensional Packet Classifier for NP-Based Firewalls," Jan. 2004, retrieved from the internet on Aug. 12, 2009: <URL: http://ieeexplore.ieee.org/stamp/stamp.jsp?tp=&arnumber=1266123&isnumber=28312>.
Office Action for U.S. Appl. No. 11/076,591, mailed Jul. 20, 2010, 33 pgs.
Office Action for U.S. Appl. No. 12/506,140, mailed Sep. 1, 2010, 11 pgs.
Office Action for U.S. Appl. No. 12/579,566, mailed Oct. 6, 2010, 7 pgs.
Web site page entitled "Our Products," downloaded from http://web.archive.org/web/20010815034246/rocksteady.com/product.htmI and printed Nov. 2, 2010, 1 pg.
Web site page entitled "About RockNET," downloaded from http://web.archive.org/web/20010824234659/rocksteady.com/rocknet.html and printed Nov. 2, 2010, 2 pgs.
Web site page entitled "About RockNOC," downloaded from http://web.archive.org/web/20010825000449/rocksteady.com/rocknoc.html and printed Nov. 2, 2010, 1 pg.
Web site page entitled "Our RockBOX," downloaded from http://web.archive.org/web/20010824233630/rocksteady.com/rockbox.html and printed Nov. 2, 2010, 2 pgs.
Web site page entitled "About RockSteady," downloaded from http://web.archive.org/web/20010825001007/rocksteady.com/techdetails.html and printed Nov. 2, 2010, 2 pgs.
Web site page entitled "Your RockSteady Network," downloaded from http://web.archive.org/web/20010723202022/rocksteady.com/popup.html and printed Nov. 2, 2010, 1 pg.

Discussion of Conceptual Difference Between Cisco IOS Classic and Zone-Based Firewalls, Oct. 2007, 4 pgs., Cisco Systems, Inc., San Jose, CA.

Cisco IOS Firewall Zone-Based Policy Firewall, Release 12.4(6)T, Technical Discussion, Feb. 2006, 77 pgs., Cisco Systems, Inc., San Jose, CA.

Zone-Based Policy Firewall Design and Application Guide, Document ID: 98628, Sep. 13, 2007, 49 pgs., Cisco Systems, Inc., San Jose, CA.

SP Maj, W Makairanondh, D Veal, "An Evaluation of Firewall Configuration Methods," IJSCSNS International Journal of Computer Science and Network Security, vol. 10, No. 8, Aug. 2010, 7 pgs.

Using VPN with Zone-Based Policy Firewall, May 2009, Cisco Systems, Inc., San Jose, CA, 10 pgs.

Cisco IOS Firewall Classic and Zone-Based Virtual Firewall Application Configuration Example, Document ID: 100595, Feb. 12, 2008, 20 pgs., Cisco Systems, Inc., San Jose, CA.

Class-Based Policy Provisioning: Introducing Class-Based Policy Language (CPL), Aug. 2008, 36 pgs., Cisco Systems, Inc., San Jose, CA.

Cisco IOS Zone Based Firewall Example, at http://www.linickx.com/archives/2945/cisco-ios-zon . . ., printed Dec. 7, 2010, 6 pgs., LINICKX.com.

Zone-Based Policy Firewall, Published Feb. 22, 2006, Updated Jun. 19, 2006, 46 pgs., Cisco Systems, Inc., San Jose, CA.

Applying Zone-based Firewall Policies in Cisco Security Manager, Published Mar. 2009, Revised Sep. 2009, 64 pgs., Cisco Systems, Inc., San Jose, CA.

"FreeBSD Handbook, Chapter 30 Firewalls," 2003, found at www.freebsd.org/doc/handbook/firewalls-ipfw.html, printed Dec. 27, 2010, 13 pgs.

Watters, Paul, "Solaris 8 Administrator's Guide. Chapter 4, Network Configuration," O'Reilly & Associates, Inc., Jan. 2002, 17 pgs.

Spitzner, Lance, "Configuring network interface cards; getting your interfaces to talk," Mar. 23, 2004, 4 pgs.

Gite, Vivek, "Redhat/CentOS/Fedora Linux Open Port," Sep. 13, 2007, found at www.cyberciti.biz/faq/howto-rhel-linux-open-port-using-iptables/ printed Jan. 3, 2011, 7 pgs.

Office Action for U.S. Appl. No. 12/617,211, dated Feb. 3, 2011, 14 pgs.

"Managing Firewall Services," User Guide for Cisco Security Manager 3.3.1, Oct. 2009, Ch. 11, 90 pgs., Cisco Systems, Inc., San Jose, CA.

"Cisco Common Classification Policy Language," Cisco Router and Security Device Manager 2.4 User's Guide, Ch. 34, 2007, 32 pgs., Cisco Systems, Inc., San Jose, CA.

Guide to User Documentation for Cisco Security Manager 4.0, Jun. 18, 2010, 6 pgs., Cisco Systems, Inc., San Jose, CA.

Cisco Configuration Professional: Zone-Based Firewall Blocking Peer to Peer Traffic Configuration Example, Document ID: 112237, Updated Dec. 3, 2010, 25 pgs., Cisco Systems, Inc., San Jose, CA.

Tuning Cisco IOS Classic and Zone-Based Policy Firewall Denial-of-Service Protection, 2006, 10 pgs., Cisco Systems, Inc., San Jose, CA.

Holuska, Marty, Using Cisco IOS Firewalls to Implement a Network Security Policy, Fort Hays State University/INT 490, printed Dec. 6, 2010, 5 pgs., at http://quasarint.com/Capstone/zb_policy.php.

Cisco Feature Navigator, Cisco Systems, Inc., San Jose, CA, at http://tools.cisco.com/ITDIT/CFN/Dispatch, printed on Dec. 2, 2010, 4 pgs.

Office Action for U.S. Appl. No. 12/506,140, mailed Feb. 18, 2011, 13 pgs.

Notice of Allowance for U.S. Appl. No. 12,579,566, mailed Mar. 23, 2011, 5 pgs.

Notice of Allowance for U.S. Appl. No. 12/579,566, mailed May 13, 2011, 8 pgs.

Office Action for U.S. Appl. No. 12/617,211, mailed Jul. 19, 2011, 18 pgs.

Office Action for U.S. Appl. No. 12/506,140, mailed Aug. 4, 2011, 18 pgs.

Notice of Allowance for U.S. Appl. No. 12/579,566, mailed Aug. 26, 2011, 9 pgs.

Notice of Allowance issued in U.S. Appl. No. 10/683,317, mailed Nov. 28, 2011, 11 pages.

Notice of Allowance for U.S. Appl. No. 12/617,211, mailed Nov. 10, 2011, 8 pages.

Office Action for U.S. Appl. No. 12/753,390, mailed Dec. 8, 2011, 10 pages.

Notice of Allowance for U.S. Appl. No. 12/617,211, mailed Dec. 12, 2011, 8 pages.

* cited by examiner

SYSTEM AND METHOD FOR PROVIDING ACCESS CONTROL

RELATED APPLICATIONS

This application claims priority under 35 U.S.C. 119(e) to U.S. Provisional Patent Application No. 60/417,674, entitled "Access Controlled Network Sharing," to Richard MacKinnon and Kelly Looney, filed Oct. 10, 2002, which is hereby fully incorporated by reference herein.

TECHNICAL FIELD OF THE INVENTION

Embodiments of the present invention relate to network access. More particularly, embodiments of the present invention relate to providing access control for a shared network.

BACKGROUND

The communication of data over networks has become an important, if not essential, way for many organizations and individuals to communicate. The Internet is a global network connecting millions of computers using a client-server architecture in which any computer connected to the Internet can potentially receive data from and send data to any other computer connected to the Internet. The Internet provides a variety methods in which to communicate data, one of the most ubiquitous of which is the World Wide Web. Other methods for communicating data over the Internet include e-mail, usenet newsgroups, telnet and FTP.

Users typically access the Internet either through a computer connected to an Internet Service Provider ("ISP") or computer connected to a local area network ("LAN") provided by an organization, which is in turn, connected to the ISP. The ISP provides a point of presence to interface with the Internet backbone.

Routers and switches in the backbone direct data traffic between the various ISPs.

To access a LAN and, in turn, the Internet, many prior art access control systems require a user to connect his or her computer to a wired network (e.g., through an Ethernet port) and enter a user name and password. If the user name and password match a user name and password in an authentication database, the user will be provided access to the network. These systems typically assume that a user is tied to a particular physical port, such as a port in the user's office. Based on this assumption, provisioning of bandwidth to the user occurs by physically provisioning the port to which the user is connected. If the user moves to a different port, the user will typically be provided with the bandwidth provisioned to the new port. Thus, provisioning of bandwidth is done on a per port rather than a per user basis.

General internet access provided via broadband technology (e.g., Digital Subscriber Line, DOCSIS or analog cable modem, or similar technologies) are capable of provisioning bandwidth to a computer premise equipment (CPE) device. CPE provisioning can be dynamic and remotely administered. However, broadband technology adoption is not a single-user and, hence, is not user-specific provisioning.

An increasing number of organizations (e.g., businesses, governmental organizations) wish to provide access to LANs and the Internet to various classes of users (internal users, contractors, customers, visitors). For example, many cafes have public wireless networks to allow patrons to access the Internet, receive email and perform other network activities. While users may be asked to authenticate to use the network, bandwidth is provisioned to the wireless routers, not the individual users. This means that one user connected to a particular router can consume a majority of the bandwidth (e.g., downloading pictures from the Internet), slowing down the wireless network for other users connected to that router.

An additional problem with many current networks, particularly wireless networks, is roaming between subnets. A subnet is a portion of a LAN that has a common address component. One subnet, for example, can cover a particular floor of a building, while another subnet covers another floor. Each subnet can potentially have its own set of internet protocol ("IP") addresses that may or may not overlap with the IP addresses of other subnets. When a user moves from one subnet to another, even if both subnets are part of the same LAN, the user must typically reauthenticate with the network.

This can make physically roaming between subnets frustrating because open network sessions will often be dropped.

SUMMARY OF THE INVENTION

Embodiments of the present invention provide a system and method of providing network access that eliminates, or at least substantially reduces, the shortcomings of prior art network access systems and methods. More particularly, one embodiment of the present invention provides a system of providing network access comprising a processor, a first network interface coupled to the processor, a second network interface coupled to the processor, a storage media accessible by the processor and a set of computer instructions stored on the storage media, executable by the processor. In one embodiment of the present invention, the computer instructions can be executable to receive a network communication over the first network interface from a user using a user device and determine if the network communication is associated with an authenticated user. If the network communication is not associated with an authenticated user, the computer instructions can be executable to direct the user to an authentication interface. The computer instructions can be further executable to receive credentials from the user and authenticate the user based on the credentials. If the user is authenticated, the computer instructions can receive a user profile.

Another embodiment of the present invention can include a system for providing access to a network that comprises a processor, a first network interface coupled to the processor, a second network interface coupled to the processor, a storage media accessible by the processor and a set of computer instructions stored on the storage media. The computer instructions can be executable by the processor to receive a user profile and provision a user with access to a network based on the user profile.

Another embodiment of the present invention includes a set of computer instructions stored on a storage media, executable by a processor to receive a network communication over a first network interface from a user using a user device, determine if the network communication is associated with an authenticated user, if the network communication is not associated with an authenticated user, direct the user to an authentication interface, receive credentials from the user, authenticate the user based on the credentials. If the user is authenticated, the computer instructions can be executed to receive a user profile.

Yet another embodiment of the present invention includes a set of computer instructions stored on the storage media, executable by the processor to receive a user profile and provision a user with access to a network based on the user profile.

Another embodiment of the present invention includes a method comprising receiving a user profile and provisioning a user with access to a network based on the user profile.

Another embodiment of the present invention includes a method comprising receiving a network communication over a first network interface from a user using a user device, determining if the network communication is associated with an authenticated user, if the network communication is not associated with an authenticated user, directing the user to an authentication interface, receiving credentials from the user, authenticating the user based on the credentials, and receiving a user profile if the user is authenticated.

Embodiments of the present invention provide an advantage over current systems and methods of providing access to a network by being able to authenticate a user sending network communications in any number of protocols.

Embodiments of the present invention provide another advantage over current systems and methods of providing access to a network by not requiring propriety client software to authenticate.

Embodiments of the present invention provide yet another advantage over current systems and methods of providing network access by provisioning network access on a per user rather than per port basis.

Embodiments of the present invention provide yet another advantage over current systems and methods of providing network access by supporting the ability of a user to physically roam without requiring reauthentication on different subnets.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method of network access control. According to one embodiment of the present invention, a control device can sit between a network (e.g., an Internet, a LAN or other network known in the art) and users. The users themselves may be located on a network or subnet or may connect directly to the control device. When a particular user attempts to access the network behind the control device (i.e., the controlled network), the control device can determine if the user has already been authenticated to use the controlled network. If the user has not been authenticated, the control device can direct the user to an authentication interface, such as a web page, and receive a set of credentials from the user. If the user is authorized to use the controlled network, based on the credentials, the control device can provision the user with access to the controlled network based on user specific settings.

Figure 1:
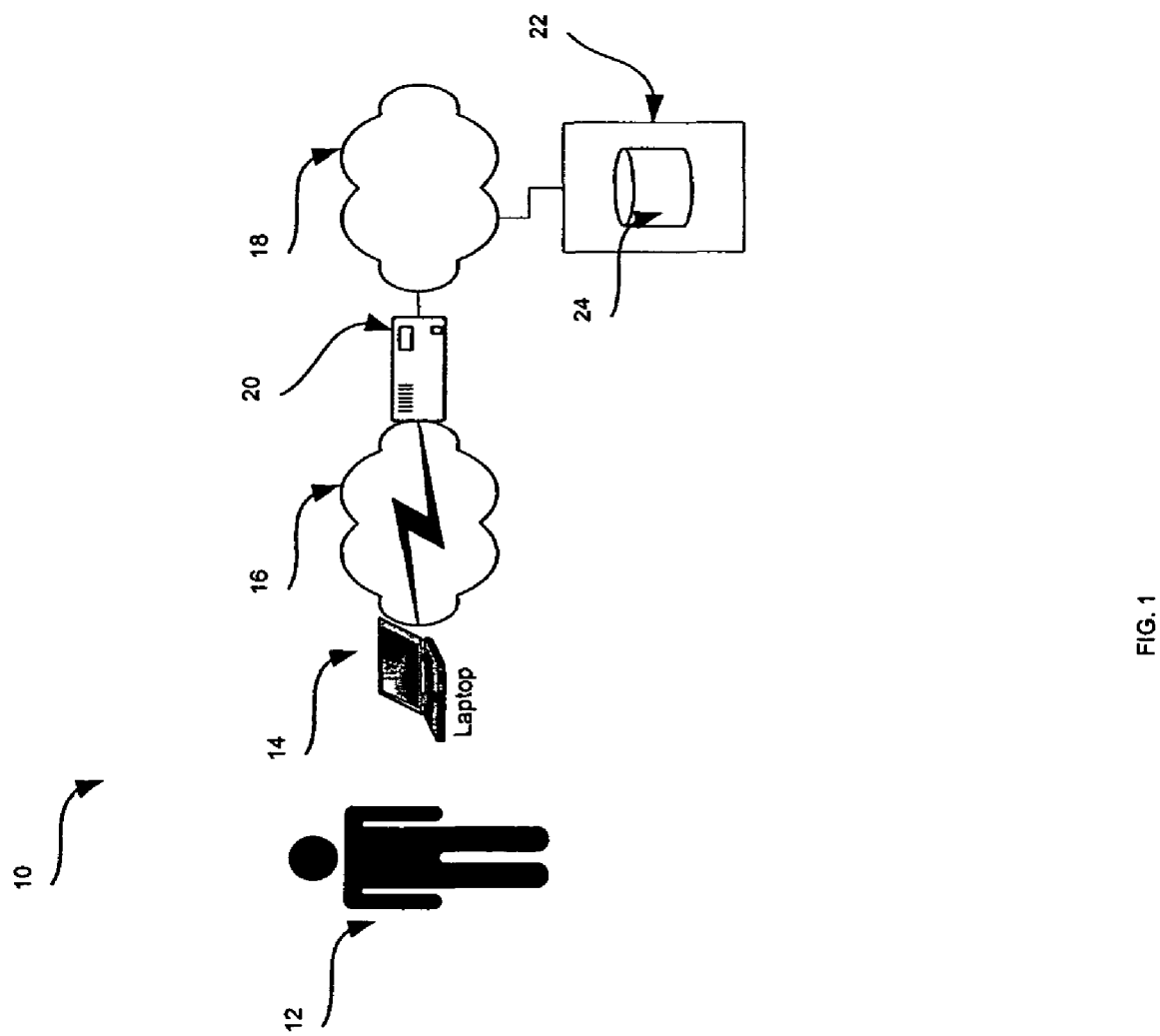
FIG. 1 is a diagrammatic representation of a system for providing network access according to one embodiment of the present invention.

FIG. 1 is a diagrammatic representation of a system 10 for providing network access according to one embodiment of the present invention. In system 10, a user 12, using a user device 14 on network 16, can send a network communication that is destined for a device on controlled network 18. Network 16 and controlled network 18 can be any networks known in the art including, but not limited to, LANs, WANs, the Internet, global communications networks, wireless networks and/or any other communications network known in the art. For the sake of example, network 16 can be a wireless network, such as public wireless network provided to cafe patrons, and controlled network 18 can be the Internet. An access control device 20 ("control device 20") can receive the network communication and determine if user 12 is authorized to access network 18 and the extent of the user's access. Control device 20 can contact an authentication system 22 to authenticate user 12 against a set of authorized users stored, for example, in authentication database 24. If user 12 is authenticated, access control device 20 can receive a user profile that includes one or more attributes that govern the user's access to controlled network 18.

According to one embodiment of the present invention, user device 14 can comprise any computing device known in the art (e.g., desktop, laptop, PDA, mobile phone or any other device capable of network communication) and can be connected to control device 20 in any manner known in the art (e.g., by LAN, wireless network, direct connection or other manner known in the art). In the example of FIG. 1, user 12 is using a laptop 14 on a public wireless network 16 (e.g., a wireless LAN) to access Internet 18.

User 12 can send the network communication using a network application running on user device 14 destined for a device on network 18. The network application can be any publicly available network application (e.g., a web browser, email program, etc.) or proprietary application. For example, user 12 can use an internet browser, such as Netscape Navigator or Microsoft Internet Explorer, to send a request for a web page available over Internet 18. As would be understood by those of ordinary skill in the art, the web page request is transmitted as an HTTP request in one or more internet protocol ("IP") packets.

Control device 20 can monitor network 16 for network communications originating on network 16 (e.g., for example for IP packets originating on LAN 16) using any network monitoring technique known in the art. Control device 20 can read the IP packet headers to extract information on the originating user device. As an example, control device 20 can read the packet headers corresponding to the web page request to determine the IP address and MAC address associated with laptop 14.

Based on the MAC address, IP address or other information that can be extracted from the network communication, control device 20 can determine if user 12 has been authenticated. This can be done, for example, by comparing the MAC address and IP address of user device 14 to MAC addresses and IP addresses for users that have been authenticated. If the user has not authenticated, control device 20 can direct user 12 to an authentication interface by, for example, redirecting the HTTP request to a login web page that requests user credentials, such as user name and password.

Control device 20 can receive the user credentials and send the credentials to authentication system 22. Authentication system 22 can compare the credentials to credentials in authentication database 24 to determine if user 12 is permitted access to network 18 and the extent of the user's access. If the credentials are authenticated, authentication system 22 can pass a user profile associated with user 12 to control device 20.

The user profile can include parameters that determine the extent of a user's access to network 18 and/or services available to that user. For example, the user profile can indicate that a user is permitted certain upload and download data transfer rates, that the user is not permitted to visit particular web sites, or that the user qualifies for virus scanning. In one embodiment of the present invention, the constraints indicated in the user profile can be implemented through one or more applications at control device 20.

When control device 20 receives a user profile from authentication system 22 (or self authenticates the user), control device 20 can establish a control session for the user, indicating that the user is currently active. Additionally, control device 20 can establish provisioning rules based on the user profile. The provisioning rules can include, for example, firewall rules and traffic constraints that govern the user's access to network 18. In one embodiment of the present invention, the sessions and provisioning rules can be indexed to a particular user. This can be done, for example, by associating the control session and rules to a key based on the MAC address and/or IP address of laptop and/or user credentials. The use of user credentials as part of an indexing key allows multiple sessions by the same user using different devices (e.g., a user accessing network 18 through a laptop and PDA) to be tied together for, for example, billing purposes.

It should be noted that FIG. 1 is provided by way of example only. In other embodiments of the present invention, control device 20 can control access to multiple networks. For example, if a user requests a web page over a cafes publicly available wireless connection, the user may need to access both additional portions of the cafe's internal LAN (e.g., routers, switches or other network devices) and the Internet. Additionally, it should be noted that authentication, in one embodiment of the present invention, can be performed at control device 20 or be carried out by a separate authentication system.

Figure 2:
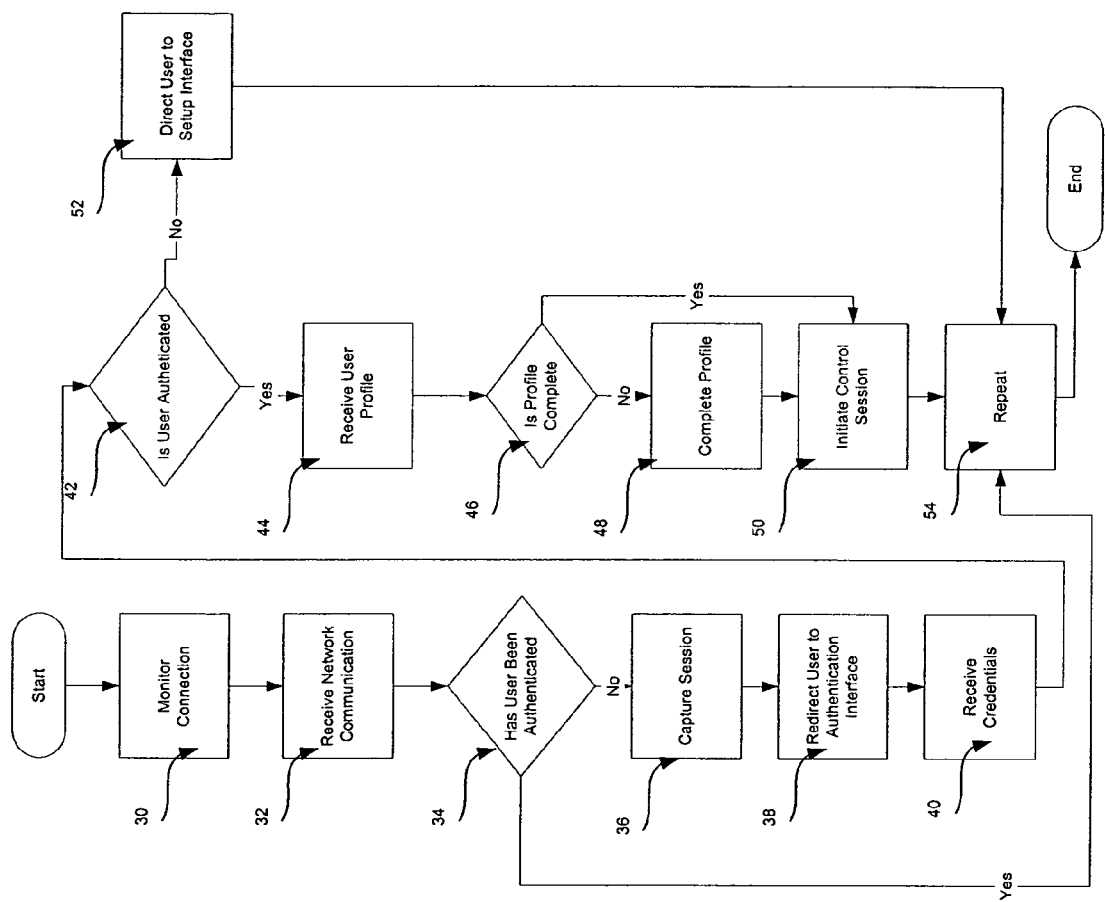
FIG. 2 is a flow chart illustrating one embodiment of a method for providing network access control.

FIG. 2 is a flow chart illustrating one embodiment of a method for providing network access control at, for example, a control device (e.g., control device 20 of FIG. 1). At step 30, the control device can monitor a connection, such as a LAN, across protocol layers (e.g., IP, UPD/IP, TCP/IP and other protocol layers known in the art) for a network communication originating at a user device and, at step 32, receive a network communication. The network communication can be, for example, an HTTP request, an email message, an FTP request, a telnet request, an instant message, an ICMP message, a SNMP message, a UDP message or other network communication known in the art.

The control device can determine, at step 34, if a user associated with the network communication has been authenticated. In one embodiment of the present invention, this can be done by comparing an identifier(s) with identifiers previously associated with authenticated users. Any identifier or combination of identifiers known in the art can be used to identify the origins of a network communication. By way of example, but not limitation, the control device can read the headers of IP packets carrying the network communication to extract an originating MAC address and/or an originating IP address associated with the originating user device. The control device can compare the identifier(s) extracted from the IP packet to identifiers for previously authenticated users. If the extracted identifier matches an authenticated user, the control device can control the user's network access as described in conjunction with the example of FIG. 5. Otherwise, control can pass to step 36.

If a user has not authenticated, the control device, at step 36, can capture the user's network application session until the user authenticates. For applications that are latency or session sensitive, such as HTTP or HTTPS communications, the session may be cached or suspended in a manner that does cause the destination application (e.g., web page) to drop the session. For example, if the user enters into a stateful network application session, the control device can detect this, based on information in the IP packets, and maintain the session on behalf of the user until the user has authenticated.

At step 38, the control device can redirect the user to an authentication interface. By way of example but not limitation, if the network communication is an HTTP request, control device 20 can redirect the HTTP request to an authentication web page hosted by the control device using any HTTP redirection technique known in the art. If the network communication is in another form, such as an email message, the control device can detect, from the IP packets, the protocol (e.g., POP, SMTP or other protocol known in the art) used by the network application (e.g., a mail user agent) and send a message back to the network application with, for example, an embedded link to the authentication interface. In other embodiments of the present invention, the control device can send a protocol-specific message, such as an error message, indicating the authentication state and providing information about further actions necessary on part of the user to authenticate. As an example, if an unauthenticated user initiates a telnet session, the control device can return a telnet error indicating a failed authentication and providing directions to the application interface. Thus, the control device, rather than simply returning "Connect Failed" could return "Connect Failed: Authenticate at http://www.Rocksteady1.com/login//." In this case, http://www.Rocksteady1.com/login// can be hosted by the control device.

In response to the authentication interface, the user can provide credentials and, at step 40, the control device can receive them. The credentials can be any credentials known in the art including, but not limited to, user name, password, biometric data (e.g., fingerprint, retina pattern or other biometric information known in the art), smart card credentials, certificates and/or other user or hardware based credentials. In one embodiment of the present invention, the credentials can be received by HTTP Post from a web page based form.

At step 42, the control device can authenticate the user by initiating a comparison between the received credentials and the credentials for authorized users.

This can be done at the control device, or the control device can authenticate the user by sending the credentials to a backend authentication system (e.g., using HTTP Post). The credentials, in one embodiment of the present invention, can be compared against an authentication database of authorized users to determine if the credentials match credentials in the authentication database. Example authentication technologies include LDAP, RADIUS, Microsoft Active Directory Service, Tivoli Access Manager, and Cisco TACACS/TACACS+.

If the credentials are not authenticated, control can pass to step 52. If, on the other hand, the credentials are authenticated, the control device, at step 44, can receive a user profile from the authentication system or internal data storage (e.g., a database, file or other data storage format known in the art) that contains attributes that govern provisioning of user access to the network. For example, the user profile can contain indicators of the upload and download bandwidth to which the user is entitled, session time limit, whether the control device will perform virus scanning for the user of incoming and/or outgoing IP packets, or other services known in the art. The user profile can also point to additional information that can be used to control network access. For example, the user profile can point to a list of web sites that the particular user is not permitted to visit. In one embodiment of the present invention, the user profile can be received in a canonical format as an HTTP Post from the authentication system to the control device.

According to one embodiment of the present invention, each user profile can have a predefined set of attributes. In some cases, the backend authentication system may not provide values for each of these attributes. Therefore, the control device can determine, at step 46, if the received user profile is complete, and, if it is not complete can, at step 48, fill in the missing attribute values with default values, which can be part of the control device's local configuration or may be retrieved by the control device during, for example, its initialization or startup phase. At step 50, the control device can initiate a control session for the authenticated user. The control session can have a specified time limit, a time out limit and/or other session features known in the art. While the control session is active, the control device can govern a user's access to a network according to the user profile associated with that user and defaults. The control session can be tracked by credentials, IP address, MAC address and/or other identifier. In one embodiment of the present invention, the control session can be tracked based on a combination of user device MAC address and IP address and user provided credentials.

Thus, the control device can determine if the user seeking to use a network is authorized to use the network (step 42). According to one embodiment of the present invention, if the user is authenticated, the control device receives a user profile (step 44), fills in any missing parameters in the user profile with defaults (steps 46 and 48) and initiates a control session for the user (step 50).

If, however, at step 42, the user is not authenticated, the control device, at step 52, can direct the user to a setup interface, such as an account setup web page. At the setup interface, the user can specify credentials, network access and levels of service, payment options and/or other account information. Based on this information, a user profile can be generated and stored in the authentication database. Profiles can also be entered into the authentication database by a systems administrator or in any other manner known in the art.

The control device can, thus, authenticate a user based on a network communication from a network application such as a web browser, ftp client, telnet client, mail user agent or other publicly available or proprietary network application. By supporting publicly available network applications, such as web browsers, embodiments of the present invention allow authentication without requiring that a user install a proprietary network application on the user's user device. If a user can authenticate, the control device can control a user's access to a controlled network based on a user profile and/or default values. If the user can not authenticate, the user can be given an opportunity to establish a user profile. According to one embodiment of the present invention, steps 30-54 can be optionally repeated (step 54) for each new network communication or IP packet detected.

Figure 3:
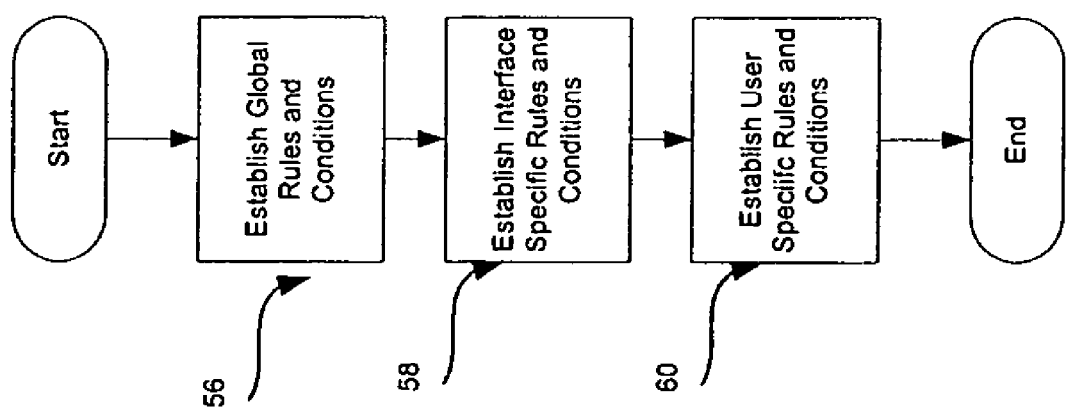
FIG. 3 is a flow chart illustrating one embodiment of provisioning user access to a network.

FIG. 3 is a flow chart illustrating one embodiment of provisioning user access to a network at a control device (e.g., control device 20 of FIG. 1). At step 56, global rules can be established. Global rules can include rules, such as firewall rules and bandwidth allocations. A firewall rule can include any firewall rule known in the art, such as, for example, that all packets destined for a particular web site will be blocked. A traffic rule can include any globally applicable traffic rule; for example, that the total used bandwidth of control device 20 must not exceed a particular amount. Additionally global rules can include rules such as that every packet is scanned for viruses or subject to some other arbitrarily defined process. At step 58, interface specific rules can be established. Interface specific rules can specify and arbitrary traffic rule or condition on a per interface basis. For example, an interface specific firewall rule can specify that streaming content will not be permitted over a wireless interface. Global and interface specific rules can be established in any manner, as would be understood by those of ordinary skill in the art.

At step 60, the control device can establish user specific rules and conditions based on attributes in the user profile. According to one embodiment of the present invention, the control device can map the attributes to any arbitrary rule or traffic condition. By way of example, but not limitation, a user profile can contain attributes to specify upload and download bandwidth allocations for a user, firewall settings, whether the user can use transient VPNS, whether the user can use streaming services or voice over IP services, whether the user should be permitted to perform video teleconferencing, whether the control device should perform virus scanning or worm detection for the user, whether the user can utilize print services, surcharges for services or other settings. On example of supporting transient VPN is described in U.S. Provisional Patent Application No. 60/496,629, entitled "System and Method for Providing a Secure Connection Between Networked Computers," to Eric White, et al., filed Aug. 20, 2003, which is hereby fully incorporated by reference.

In one embodiment of the present invention, rules can be represented in an IP table. As would be understood by those of ordinary skill in the art, IP tables are essentially tables of rules that can be accessed by applications, such as a firewall, to execute the rules.

Rules in the IP table can be associated to a user through any arbitrary identifier. Using the example of FIG. 1, the IP table rule(s) for user 12 can be bound to user 12 based on the MAC address and IP address of user device 14 and the credentials provided by user 12 for the particular control session.

An IP table rule can reference other rules or parameters for providing user specific provisioning. As an example, the IP table rule can reference websites that a user is not permitted to visit. A firewall application can access the rule to prevent the user from visiting these sites. As another example, the IP table rule for user 12 can reference a traffic rule that dictates that the bandwidth allocated to user 12 is 128 kbps up and 512 kbps down. A traffic control application, such as the Linux based Traffic Control module, can access the traffic control rule through the IP table and enforce the bandwidth allocation.

It should be noted that a user specific rule in an IP table can reference rules or parameters usable by any number of applications or process, such as firewalls, traffic control modules, virus scan applications or other applications known in the art.

Figure 4:
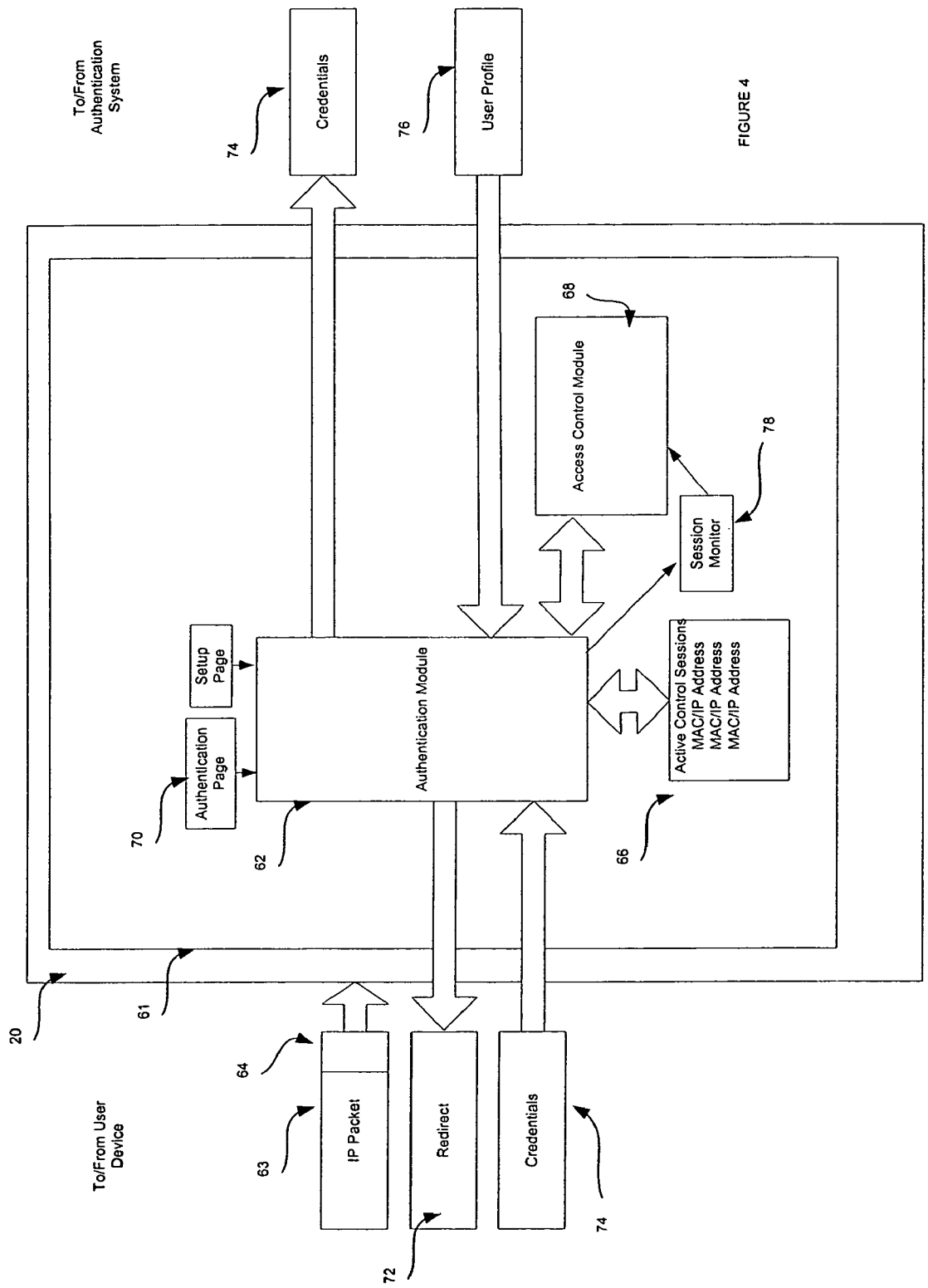
FIG. 4 is a diagrammatic representation of a software architecture for providing authentication, according to one embodiment of the present invention.

For example, a virus scan application can access the IP table rule for a particular user and us parameters referenced by the rule to provide user specific virus scanning. It should be further noted that the use of IP tables to establish user specific rules for user specific provisioning of bandwidth and access control is provided by way of example only, and user specific rules can be implemented in any suitable manner, as would be understood by those of ordinary skill in the art FIG. 4 is a diagrammatic representation of a software architecture for providing authentication, according to one embodiment of the present invention. The software architecture can be implemented, for example, at control device 20. According to one embodiment of the present invention, an authentication module 62 of an authentication and control program 61 can monitor a connection, such a network connection for communications from user devices. Control device 20 can receive a network communication in the form of, for example, one or more IP packets 63, which can represent a network communication from a web browser, a telnet client, a mail user agent or other communication from a network application. In one embodiment of the present invention, the network communication can be directed to control device 20 to access authentication page 70 or to another destination, such as a web server on the Internet.

Authentication module 62 can read the header 64 of IP packet 63 to determine an identifier for the originating user device such as, for example, an originating MAC address and/or IP address. For the sake of example, the MAC address is 08:00:69:02:01:FF and the IP address is 100.100.100. Authentication module 62 can then determine if the IP packet originated at a user device for which a control session is active by comparing information extracted from the header to a list 66 of active control sessions. The active control sessions can be indexed by, for example, MAC address, IP address, a combination of addresses or other identifier(s) associated with the originating user device or user. If a control session is active for the originating user device, the IP packet and header information can be passed to provisioning module 68. If the IP packet originated at a user device not associated with an active control session, control device 20 can authenticate the user.

According to one embodiment of the present invention, to authenticate the user, control device 20 can redirect the user to an authentication interface, such as authentication web page 70, by sending a redirect message 72. Redirect message 72 can be a web page redirect, an error message, an email message with an embedded link to web page 70 or other indication that a user should access the authentication interface.

A user can provide credentials 74 to control device 20 and control device 20 can pass the credentials 74 to an authentication system as, for example, an HTTP Post. If the credentials are authenticated by the authentication system, authentication module 62 can receive a user profile 76 that contains attributes that can govern provisioning of access control for the user. In one embodiment of the present invention, if the user profile is incomplete, authentication module 62 can add default attributes to the profile. Furthermore, if the user is authenticated by the authentication system, session monitor 78 can initiate a new control session if the credentials are authenticated and update the list 66 of active control sessions. It should be noted that in another embodiment of the present invention, authentication can occur internally to control device 20.

Figure 5:
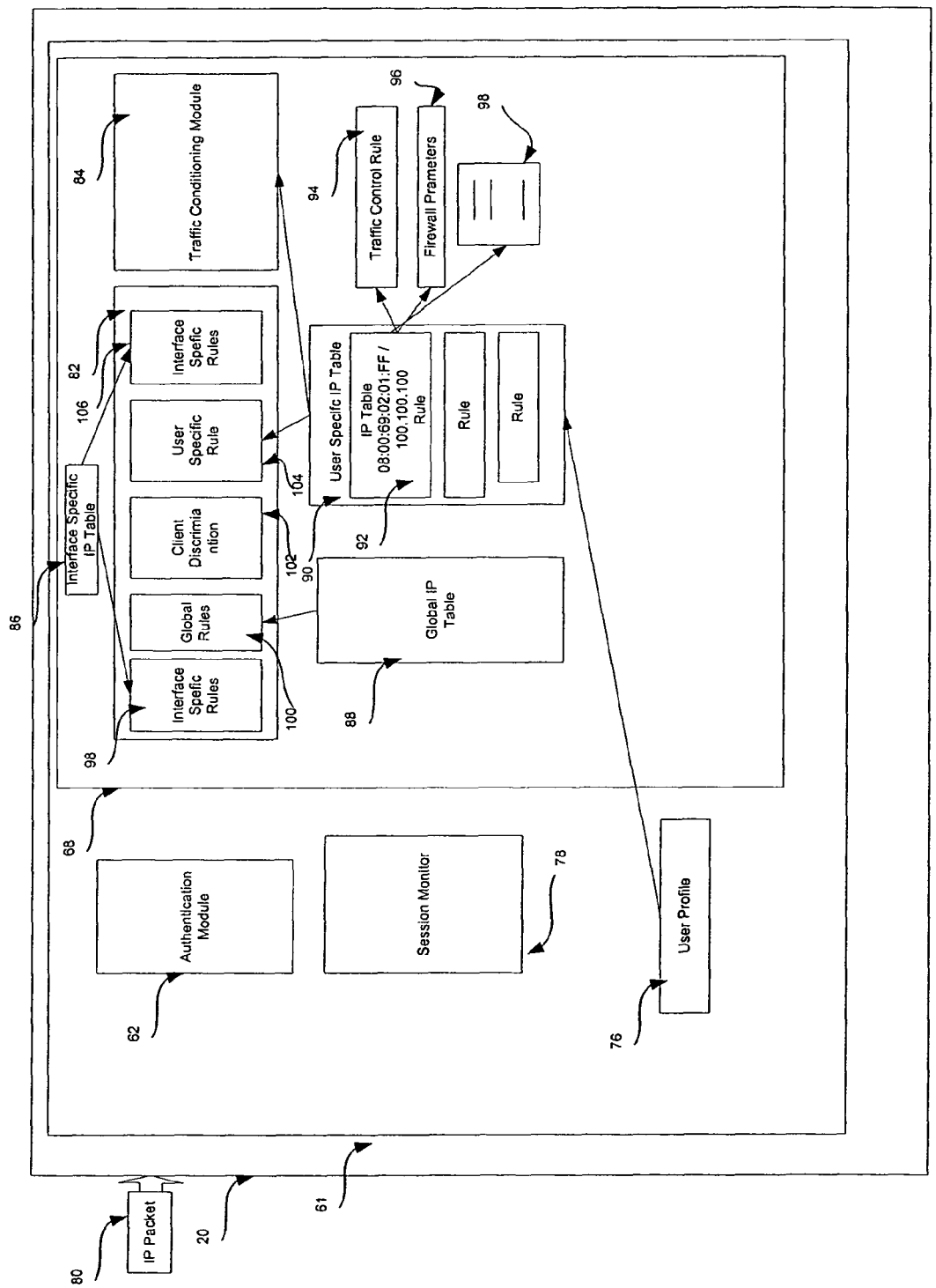
FIG. 5 is a diagrammatic representation of one embodiment of a software system for controlling access to a network for an authenticated user.

FIG. 5 is a diagrammatic representation of one embodiment of a software system for controlling access to a network for an authenticated user. According to one embodiment of the present invention, an authentication and control program 61 running at control device 20 can receive an IP packet 80 originating from a user device. Authentication module 62 can determine if IP packet 80 is associated with a user that has authenticated, as described in conjunction with FIG. 4. Continuing with the previous example, and assuming that the user associated with MAC address 08:00:69:02:01:FF and the IP address 100.100.100 authenticated, IP packet 80 can be processed by provisioning module 68, which can provide user specific provisioning. In the example of FIG. 5, user specific provisioning can include provisioning of firewall services (e.g., by firewall module 82), user specific allocation of bandwidth (e.g., by traffic conditioning module 84). It should be understood, however, that user specific provisioning can include provisioning of additional services known in the art. In one embodiment of the present invention firewall module 82 can be a LINUX based firewall and traffic conditioning module 84 can be the LINUX based Traffic Controller program.

According to one embodiment of the present invention, provisioning module 68 can build a set of IP tables to govern provisioning by firewall module 82 and traffic conditioning module 84. In the example of FIG. 5, provisioning module 68 can have IP table 81 for interface specific rules, IP table 88 for global rules and IP table 90 for user specific rules. IP table 90 can contain user specific rules associated with particular users. For example, IP table 90 can contain user rule 92 indexed to MAC address 08:00:69:02:01:FF and the IP address 100.100.100 (i.e., indexed to user 12 on laptop 14).

Each rule can optionally point to additional rules and parameters. For example user specific rule 92 can point to traffic control rule 94 to govern bandwidth provisioning, firewall parameters 96 to govern firewall settings and file 98 that contains web sites that user 12 is not permitted to access. User specific rule 92 and the associated rules and parameters can be based on user profile 76. As an example, user profile 76 can specify that user 12 is entitled to 128 kbps up and 512 kbps down.

Provisioning module 68 can establish traffic control rule 94, accessible by traffic conditioning module 84, that contains these limitations. Similarly, provisioning module 68 can establish firewall parameters 96 and file 98 based on attributes in user profile 76.

In the example of FIG. 5, provisioning module 68 can provide firewall and traffic conditioning services for IP packet 80. Firewall module 82, in one embodiment of the present invention, can process IP packet 80 according to several stages. At interface specific stage 98, firewall module 82 can access interface specific IP table 86 to access rules to be applied to packet 80 based on the type of interface over which packet 80 is received (e.g., wireless, Ethernet, or other interface known in the art).

At global stage 100, firewall module 82 can apply global firewall rules to packet 80 from global IP table 88. In general, firewall module 82 can apply global firewall rules to every IP packet that firewall module 82 processes.

At client discrimination stage 102, firewall module 82 can read the packet header of packet 80 to extract information to associate packet 80 with a user. Continuing with the previous example, if firewall module 82 extracts MAC address 08:00:69:02:01:FF and the IP address 100.100.100, firewall module 82 can associate packet 80 with user specific rule 92. At user specific rule stage 104, firewall module 82 can access user specific rule 92 based, for example, on the extracted MAC address and IP address. Based on user specific rule 92, firewall module 82 can access firewall parameters 94 and restricted web site list 96 and can process packet 80 accordingly. It should be noted that firewall parameters 94 can include any arbitrary set of parameters that can be used by a firewall to control traffic flow. For example, firewall parameters 94 can specify whether the associated user (e.g., user 12 of FIG. 1) can use voice over IP applications, video conferencing services, transient VPN applications or other applications.

Finally, at interface specific stage 106, firewall module 82 can access interface specific IP table 86 and enforce rules corresponding to the interface over which packet 80 will be communicated (e.g., wireless connection, Ethernet connection, or other computer interface known in the art).

In one embodiment of the present invention, traffic conditioning module 84 can also access user specific IP table 90 and locate user specific rule 92, based for example, on the originating MAC address and IP address.

From user specific rule 92, traffic conditioning module 84 can locate traffic control rule 94 that specifies a maximum upload bandwidth of 128 kbps. If the user exceeds this bandwidth limitation, traffic conditioning module 84 can queue or drop packet 80.

Packet flow in the reverse direction can be processed in an analogous manner. For example, a packet arriving from the Internet destined for a user device (e.g., laptop 14 of FIG. 1) can be examined for IP address and MAC address. Based on these identifiers, user specific traffic control rules and firewall rules can be applied to the packet as governed by user specific rule 92 in IP table 90. Firewall module 82 can apply global rules based on IP table 88 and interface specific rules based on IP table 86 for both the controlled network and user side interfaces.

In addition to authentication and provisioning, authentication and control program 61 can provide session monitoring. Session monitoring can be performed in any manner known in the art. Session monitor 78 can monitor a control session for session characteristics such as session time, time out, bandwidth utilization and other session characteristics known in the art. In one embodiment of the present invention, session monitor 78 can determine if a user's session is still active by for example, performing port scans and ARP pings, as would be understood by those of skill in the art. If session monitor 78 determines that a control session is timed out (e.g., has been inactive for a predetermined period of time), session monitor can remove the control session from the list of active sessions, returning the user to an unauthenticated state, and delete the user specific rules for the associated user from IP table 90. Session monitor 78 can also generate records, such as accounting records and session records that can optionally be transmitted to other systems for further processing.

As would understood by those of ordinary skill in the art, authentication and control program 61 can also provide any arbitrary services known in the art, including, but not limited to, web server functions, DHCP client for negotiation with ISPs, DHCP server to assign IP addresses to user computers, kernel based packet filtering and stateful inspection, IP sharing, NATplus, port redirection, information and attack logging, automatic updating, VPN masquerade, remote support an configuration, name server configuration and/or web content filtering.

Figure 6:
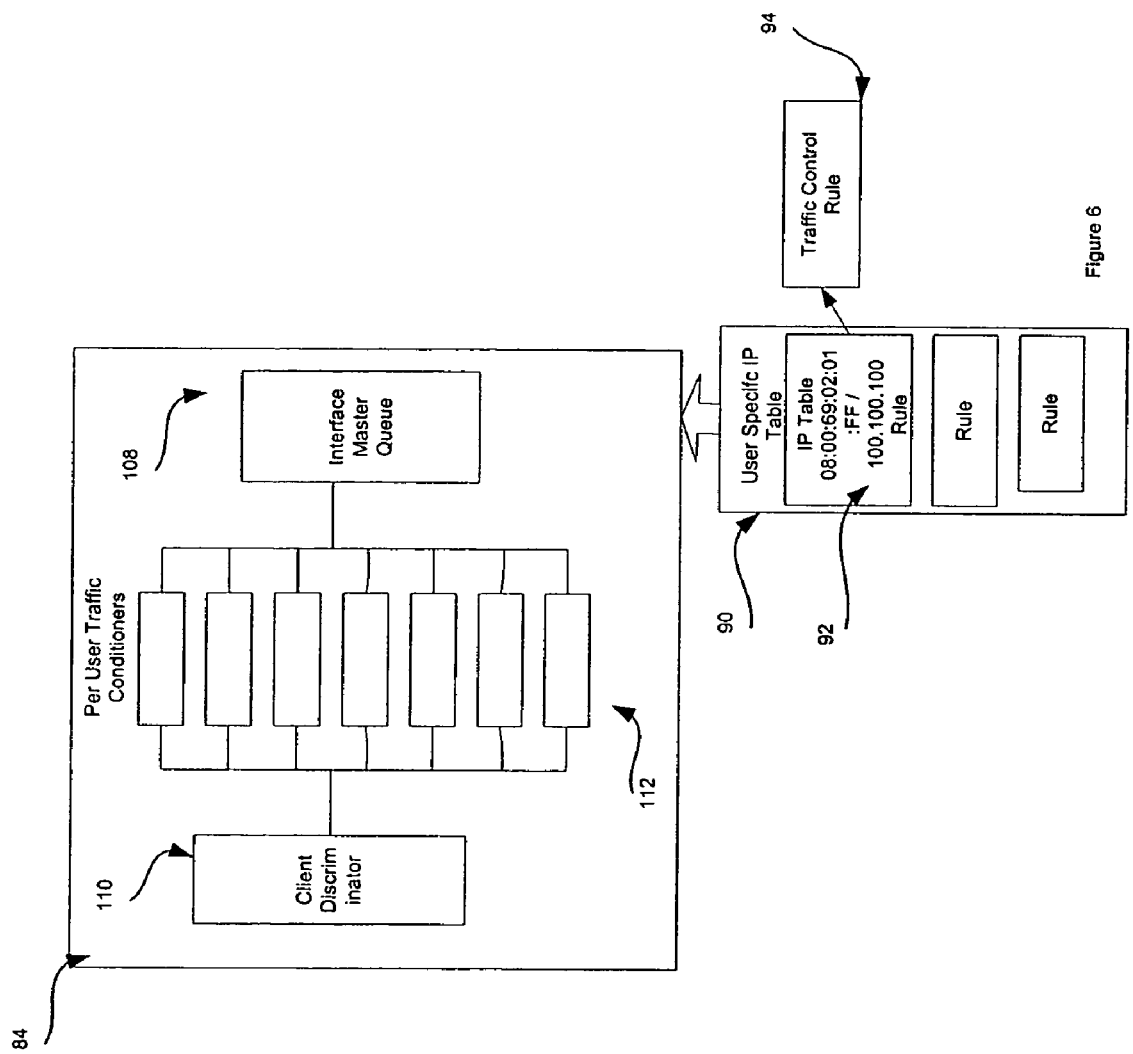
FIG. 6 is a diagrammatic representation of traffic conditioning module, according to one embodiment of the present invention.

FIG. 6 is a diagrammatic representation of traffic conditioning module 84, according to one embodiment of the present invention. Conditioning module 84 can include interface master queue 108, user discriminator 110 and user specific conditioner 112. User discriminator 110 can read a packet header to determine the appropriate user specific conditioner to which to send the packet based on for example, the IP address and MAC address of the packet. Bandwidth limits can be enforced based on user specific traffic control rules.

According to one embodiment of the present invention, conditioning module 84 can locate the user specific traffic control rule based from user specific IP table 90. For example, for a packet having the originating MAC address 08:00:69: 02:01:FF and the IP address 100.100.100, traffic conditioning module 84 can access user specific rule 92 and, from user specific rule 92, user specific traffic control rule 94. The user specific traffic control rule can be enforced at the corresponding user specific conditioner.

Interface master queue 108 can control the flow of network traffic over a particular interface. It can be configured to send out data at whatever rate is appropriate for the corresponding network connection.

Interface master queue 108 can be feed data by user specific conditioners 112, each of which can have its own queue to hold packets the conditioner has accepted, but interface master queue 108 is not ready to accept.

For a particular network interface, each user can have an inward (i.e., download) and outward (i.e., upload) bandwidth allowance, based on attributes in the user's user profile. A bandwidth limit is the maximum rate at which a user is permitted to transmit or receive network traffic over a particular interface. User specific traffic conditioners 112 ensure that, if a user exceeds his or her bandwidth allowance, further network traffic in that direction on the network will be queued or dropped until the average data rate fall back within the bandwidth allowance. Thus, traffic conditioning module 84 can regulate bandwidth on a per user basis. In one embodiment, the control device can also dynamically control bandwidth on a per user basis. One embodiment of dynamic bandwidth shaping is discussed in U.S. Provisional Patent Application No. 60/418,968, entitled "System and Method for Dynamic Bandwidth Shaping," to Kerry Clendenning, et al., filed Oct. 16, 2002, which is hereby fully incorporated by reference.

It should be noted that the architectures of FIG. 4, FIG. 5 and FIG. 6 are provided by way of example only and authentication, session monitoring and provisioning can be implemented using any suitable programming language and/or structure known in the art. In the example of FIG. 5, provisioning module 68 provides firewall and traffic conditioning based on a set of IP tables. It should be noted, however, that provisioning module 68 can provide additional services on a per user basis, such as virus scanning, worm detection or any other service known in the art. Each of these additional services can access rules and parameters based, for example, on IP table 90. Moreover, the use of IP tables to index and provide access to rules and parameters for particular services is also provided by way of example. In other embodiments of the present invention, a user profile can be mapped to rules and parameters for various applications in any suitable programming manner known in the art.

Embodiments of the present invention provide advantages over prior art systems and methods of providing access control. One advantage is that embodiments of the control device can detect network communications across a variety of protocols and direct a user to an authentication interface. Another advantage provided by embodiments of the present invention is that provisioning can be done based on a user profile rather than based on a particular port. In other words provisioning of bandwidth and services can be done on a per user rather than per port basis. Additionally, as will be described in conjunction with FIG. 7, embodiments of the present invention can provide advantages with respect to physical roaming.

Figure 7:
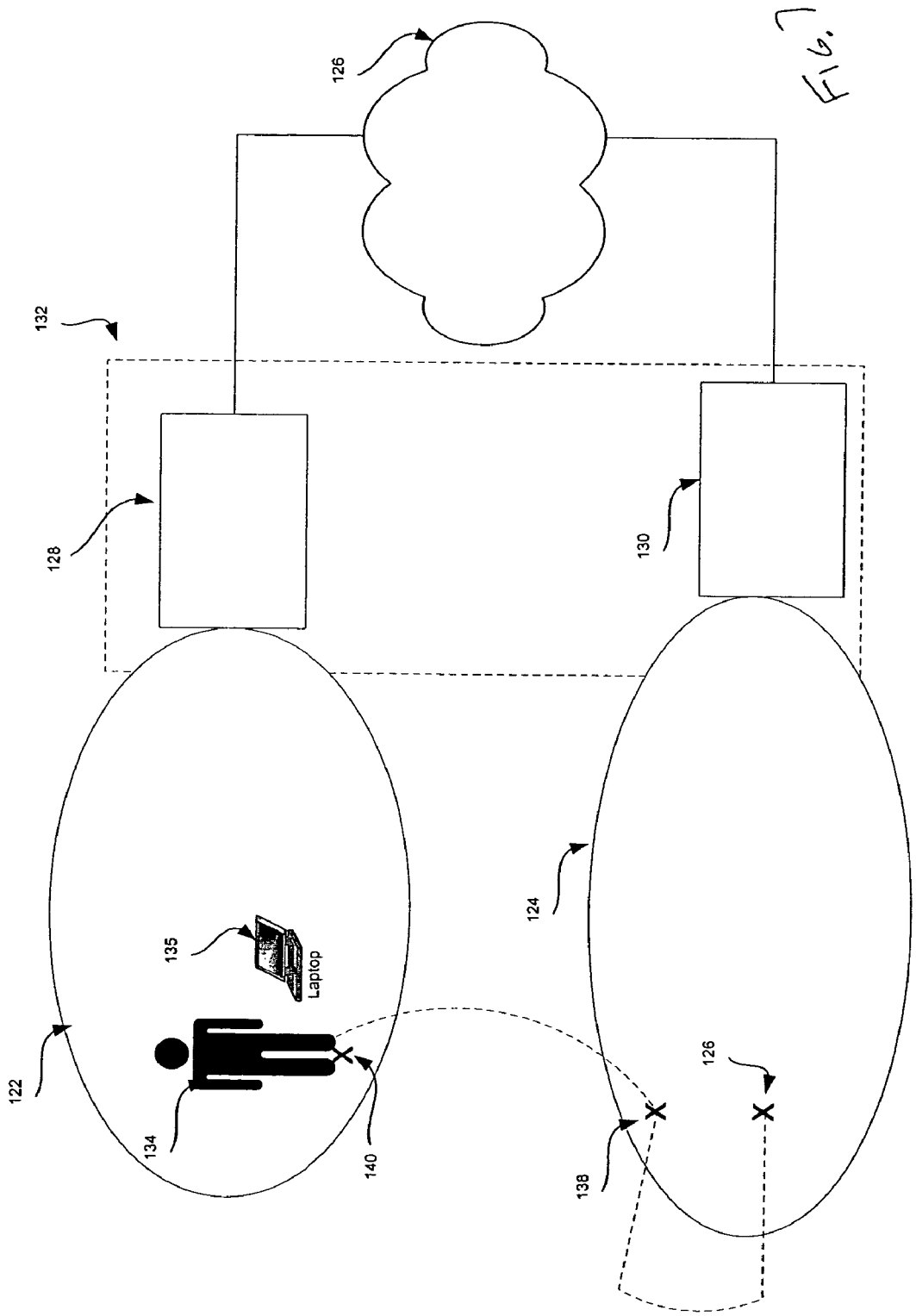
FIG. 7 is a diagrammatic representation of roaming according to one embodiment of the present invention.

FIG. 7 is a diagrammatic representation of roaming according to one embodiment of the present invention. In the example of FIG. 7, a LAN can have multiple subnets, in this case two, subnet 122 and subnet 124. For the sake of example, each subnet can be a wireless subnet.

Each subnet could represent for example subnets on different floors of an office building or subnets in different buildings, etc. Each subnet can be connected to network 126 via control device 128 and control device 130, respectively. Network 126 can be any network known in the art including a LAN, the Internet, a wireless network a global communications network or any other network known in the art. According to one embodiment of the present invention, control device 128 and control device 130 can be in federation 132. This means that control device 128 and control device 132 have at least enough information about each other that they can send messages to each other over the LAN and/or over network 126 to exchange session information.

In operation, user 134 using user device 135 (e.g., a laptop or other computing device known in the art) can authenticate with control device 130 at point 136 in subnet 124. Because user 134 is in subnet 124 at point 136, user device 135 can be assigned a first IP address, for example 100.100.100. For the sake example, user device can also be associated with MAC address 08:00:69:02:01:FF. The user's active session can be indexed based on the first IP address, the MAC address and the user's credentials. User 134 can then roam outside of subnet 124, by for example, leaving the range of the wireless routers of subnet 124. Control device 130 can determine if user 134 is still active on subnet 124 by, for example, ARP pining and/or performing port scans on user device 135 at predetermined intervals.

If control device 130 can not locate user device on subnet 124, control device 130 can begin a time out timer. If the time out timer reaches a predetermined limit, control device 130 can close the control session, returning user 134 to his or her preauthenticated state. If, however, user 134 returns to subnet 124, as, for example, determined by the ARP pings and/or port scans, within the time limit, control device 130 can reset the time out timer and keep the control session open. Assume, for the sake of example, that user 134 returns to point 138 in subnet 124 before the session is timed out, so his or her control session remains open. Thus, control device 130 can maintain user 134 in an authenticated state even though user 134 roamed outside of subnet 124.

User 134 can then roam from point 138 to point 140 with laptop 135. When user 134 leaves subnet 124, control device 130 can begin a time out timer for the user's control session. When user 134 enters subnet 122, laptop 135 can be assigned a new IP address for that subnet, say 101.100.100. If user 134 initiates a network communication destined for network 126 (e.g., a web page request), control device 128 can receive the communication and determine if IP address 101.100.100 and MAC address 08:00:69:02:01:FF correspond to an active control session. In this case, because user 134 authenticated with control device 130, IP address 101.100.100 and MAC address 08:00:69:02:01:FF will not correspond to an active session on control device 128. In one embodiment of the present invention, control device 128 can simply initiate a new authentication process.

In another embodiment of the present invention, control device 128 can query other control devices with which it is federated to determine if a user has an active control session. For example, because control device 128 and control device 130 are in federation 132, control device 128 can query control device 130 to determine if user 134 has an active session. This can be done based, for example, on the MAC address of laptop 135 as laptop 135 will typically retain the same MAC address across subnets.

According to one embodiment of the present invention, control device 128 can send an SNMP message to control device 130 to determine if there is an active session corresponding to the MAC address 08:00:69:02:01:FF. In this case, if the user's control session at control device 130 has not yet timed out, control device 130 can reply to control device 128 with session information and the user profile for user 134. Control device 128 can establish user based provisioning based on the user profile as if user 134 had authenticated at control device 128. Thus, user 134 can communicate to network 126 through control device 128 without reauthenticating.

In other embodiments of the present invention, active session information for each control device can be maintained at a centralized system. Control device 128 can, in this embodiment of the present invention, query the centralized system as to whether there are any active session corresponding to MAC address 08:00:69:02:01:FF. In yet another embodiment of the present invention, control device 128 can receive the user profile for user 134 from an authentication system rather than from another control device.

Thus, embodiments of the present invention allow a user to physically roam, either in a wired or wireless environment, by, for example permitting mobile, transient behavior through the use of network access timeouts; and/or coordinating authentications between control devices.

As can be understood from the foregoing, physically moving from one location to another can cause a user device to become disconnected from the network or subnet (e.g., subnet 122 or subnet 124) for a short period of time. The length of the time the user is not connected can be a function of physically moving from one location to another. Embodiments of the present invention permit a configurable timeout period that allows an authenticated user to become disconnected from a network and then reappear without losing the user's authentication status. In one embodiment of the present invention, this timeout period can be part of the policy of the network service provider (e.g., the entity controlling subnet 122 and subnet 124) and, as such, is a configurable item in the control devices. The control devices can monitor user network device connection states actively, employing ARP ping techniques and non-obtrusive polling of network application ports to check the connection status of all authenticated users' devices.

A second aspect of physical roaming is when a user not only becomes disconnected from the network, but leaves a subnet arbitrated or monitored by a control device. In this case, once the user attempts any network access by way of a network access port (wired or wireless) at another control device, that control device can solicit feedback from any federation of control devices with which it has joined to determine if this particular user has an active session and should be granted a new session, without the requirement to authenticate. In some embodiments of the present invention, the new control device can dynamically remap the network connections and configuration of a roaming user's user device, in the event that the new control device is configured differently or controls a different subnet. For example, the new control device can remap the IP address of the user device according any IP mapping scheme known in the art.

Control devices can participate in federations, in one embodiment of the present invention, via loosely-coupled SNMP dialogs. In this embodiment of the present invention there is no permanent federation configuration and, instead, control devices can broadcast their authorization status requests dynamically.

Another aspect of roaming can be service roaming. Service roaming can be a function of negotiated usage agreements between internet service providers, resulting in cross-indexed user authentication database and, potentially, resulting surcharges for accessing network resources via service providers other than the primary service provider associated with a user; i.e., assuming network service is funded by an individual, there may be surcharges to access network services via control devices not owned by that service provider.

Figure 8:
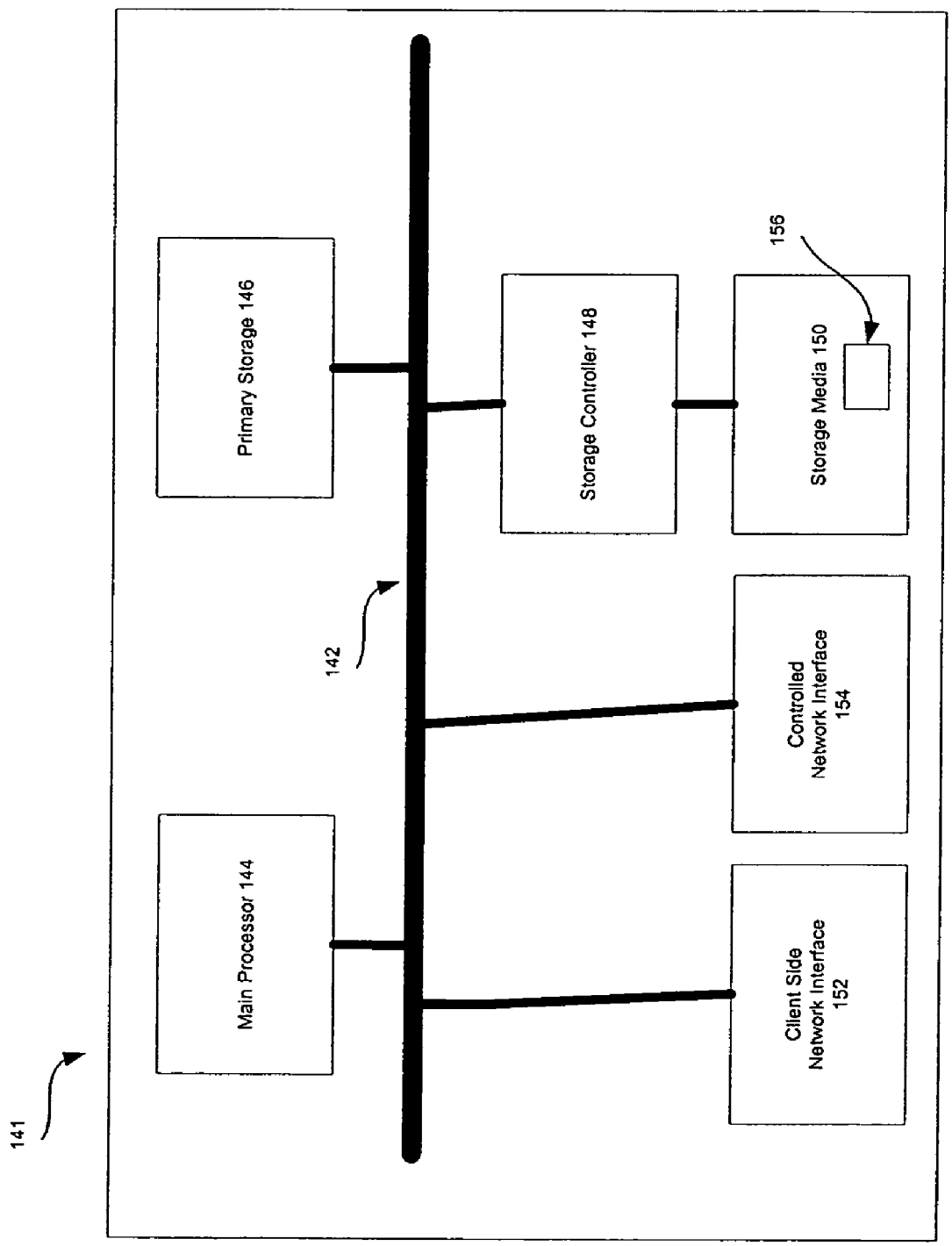
FIG. 8 is a diagrammatic representation of an example embodiment of a control device.

FIG. 8 is a diagrammatic representation of one embodiment of a control device 141 that can provide access control and authentication. For the purposes of example, control device 141 can comprise a main bus 142, a main processor 144, a primary storage medium 146, a secondary storage controller 148, a storage media 150, a user side network interface 152 and a controlled network network interface 154. The network interfaces can include Ethernet interfaces, fibre channel interfaces, T1 interfaces, wireless interfaces or other network interfaces known in the art. Other devices may be connected to or be part of such a control device include, by way of example, but not limitation, controllers, a display, a mouse, a keyboard, and so forth. Additionally, control device 140 can include additional interfaces to communicate to additional networks using various protocols and can include interfaces for administrative functions.

The main processor 144 communicates with the other components by way of the main bus 142. This main processor 144 can be a general purpose processor, a limited processor such as an ASIC or microcontroller, or any other instruction execution machine. The primary storage 146 can provide transient memory or storage space for use by programs executing on the main processor 144. The main processor 144 communicates with the primary storage in any manner known in the art.

The secondary storage controller 148 connects a storage media 150 such as a hard drive, CD-ROM, floppy, tape drive, optical storage medium, memory or other storage device to the main processor 144 by way of the main bus 142. The main processor 144 communicates with the secondary storage controller 148 by way of the main bus 142, and the secondary storage controller 148 is used to read and/or write the storage media 150 on behalf of the main processor 144.

Control device 141 may communicate with other computing devices (e.g., user devices, network servers, etc.) by way of networks using network interfaces (e.g., user side network interface 152 and controlled network network interface 154 or other network interface). Computer instructions running on the main processor may then access other computers across the network in any of the conventional ways, e.g. by executing "protocols" which affect the transmission and reception of protocol data units, packages, etc. over the data transmission network.

In one embodiment of the present invention, storage media 150 can store a set of computer instructions 156 that are executable by processor 144. During execution, portions of computer instructions 156 and data can be stored in primary storage 146, as would be understood by those of ordinary skill in the art. Processor 144 can execute computer instructions 156 to authenticate users and/or provide provisioning to users on a per user basis. Computer instructions 156 may be implemented in any programming language known in the art and can be implemented using any suitable architecture.

Additionally, in one embodiment of the present invention, storage media 150 can include a database of user profiles an authentication credentials. In this embodiment of the present invention, instructions 156 can be executable to authenticate the user at control device 141 and receive the user profile from storage media 150.

Although shown as a standalone device in FIG. 8, control device 141 may be integrated with and share components with other devices such as routers, servers, hubs or other devices known in the art. Additionally, computer instructions 156 can be distributed across multiple storage media and can be executed by multiple processors. One example of an exemplary control device is the Rock Box or the Rocksteady NSA Server, from Rocksteady Networks, Inc. of Austin, Tex.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for network access control, comprising:
   at a control device, receiving a packet originating from a user device in a first network, wherein the first network is connected to a second network via the control device, and wherein the user device is associated with a user;
   processing the packet according to a plurality of stages, including a client discrimination stage and a user specific rule stage;
   at the client discrimination stage, extracting information associated with the user device from a header of the packet and associating the packet with user specific traffic control rules and user specific firewall rules; and
   at the user specific rule stage, accessing the user specific traffic control rules and user specific firewall rules based on the extracted information associated with the user device and applying the user specific traffic control rules and the user specific firewall rules to the packet as governed by at least one user specific class of service rule associated with the user on the user device in the first network.

2. The method according to claim 1, wherein the plurality of stages further comprises an interface specific stage, further comprising:
   at the interface specific stage, applying interface specific rules to the packet based on a type of a network interface over which the packet is received.

3. The method according to claim 2, wherein the plurality of stages further comprises a global stage, further comprising:
   at the global stage, applying global firewall rules to the packet.

4. The method according to claim 1, wherein the packet is processed utilizing a provisioning module running on the control device, wherein the provisioning module comprises a first table for interface specific rules, a second table for global rules, and a third table for user specific rules.

5. The method according to claim 1, wherein the user device is assigned with an Internet Protocol (IP) address in the first network and wherein the at least one user specific rule is associated with the IP address.

6. The method according to claim 5, wherein the user device is associated with a media access control (MAC) address and wherein the at least one user specific rule is further associated with the MAC address.

7. The method according to claim 1, wherein the user specific traffic control rules and the user specific firewall rules are established for the user based on a user profile that includes parameters that determine an extent of the user's access to the second network, services available to the user, or a combination thereof.

8. A method according to claim 1, further comprising determining whether the user has authenticated.

9. A method according to claim 8, wherein the user has not authenticated, further comprising:
redirecting the user to a login web page that requests user credentials; and
using the user credentials received from the user to authenticate the user.

10. A computer program product comprising at least one non-transitory computer-readable storage medium storing computer instructions translatable by a processor of a control device to perform:
receiving a packet originating from a user device in a first network, wherein the first network is connected to a second network via the control device, and wherein the user device is associated with a user;
processing the packet according to a plurality of stages, including a client discrimination stage and a user specific rule stage;
at the client discrimination stage, extracting information associated with the user device from a header of the packet and associating the packet with user specific traffic control rules and user specific firewall rules; and
at the user specific rule stage, accessing the user specific traffic control rules and user specific firewall rules based on the extracted information associated with the user device and applying the user specific traffic control rules and the user specific firewall rules to the packet as governed by at least one user specific class of service rule associated with the user on the user device in the first network.

11. The computer program product of claim 10, wherein the plurality of stages further comprises an interface specific stage and wherein the computer instructions are further translatable by the processor to perform:
at the interface specific stage, applying interface specific rules to the packet based on a type of a network interface over which the packet is received.

12. The computer program product of claim 10, wherein the plurality of stages further comprises a global stage and wherein the computer instructions are further translatable by the processor to perform:
at the global stage, applying global firewall rules to the packet.

13. The computer program product of claim 10, wherein the computer instructions are further translatable by the processor to implement a control program on the control device, wherein the control program comprises a provisioning module, wherein the provisioning module comprises a traffic conditioning module for user specific allocation of bandwidth.

14. The computer program product of claim 10, wherein the computer instructions are further translatable by the processor to establish the user specific traffic control rules and the user specific firewall rules for the user based on a user profile that includes parameters that determine an extent of the user's access to the second network, services available to the user, or a combination thereof.

15. The computer program product of claim 10, wherein the computer instructions are further translatable by the processor to determine whether the user has authenticated.

16. The computer program product of claim 15, wherein the user has not authenticated and wherein the computer instructions are further translatable by the processor to perform:
redirecting the user to a login web page that requests user credentials; and
using the user credentials received from the user to authenticate the user.

17. A control device for network access control, comprising:
a processor;
at least one computer-readable storage medium storing computer instructions translatable by the processor to perform:
receiving a packet originating from a user device in a first network, wherein the first network is connected to a second network via the control device, and wherein the user device is associated with a user;
processing the packet according to a plurality of stages, including a client discrimination stage and a user specific rule stage;
at the client discrimination stage, extracting information associated with the user device from a header of the packet and associating the packet with user specific traffic control rules and user specific firewall rules; and
at the user specific rule stage, accessing the user specific traffic control rules and user specific firewall rules based on the extracted information associated with the user device and applying the user specific traffic control rules and the user specific firewall rules to the packet as governed by at least one user specific class of service rule associated with the user on the user device in the first network.

18. The control device of claim 17, wherein the plurality of stages further comprises an interface specific stage and wherein the computer instructions are further translatable by the processor to perform:
at the interface specific stage, applying interface specific rules to the packet based on a type of a network interface over which the packet is received.

19. The control device of claim 17, wherein the plurality of stages further comprises a global stage and wherein the computer instructions are further translatable by the processor to perform:
at the global stage, applying global firewall rules to the packet.

20. The control device of claim 17, wherein the computer instructions are further translatable by the processor to implement a control program on the control device, wherein the control program comprises a provisioning module, wherein the provisioning module comprises a traffic conditioning module for user specific allocation of bandwidth.

21. The control device of claim 20, wherein the traffic conditioning module further comprises an interface master queue for controlling a flow of network traffic over a particular network interface.

22. The control device of claim 20, wherein the provisioning module further comprises a firewall module for associating the packet with the user specific firewall rules.

23. The control device of claim 20, wherein the provisioning module further comprises an authentication module for authenticating the user.

24. The control device of claim 17, wherein the computer instructions are further translatable by the processor to establish the user specific traffic control rules and the user specific firewall rules for the user based on a user profile that includes parameters that determine an extent of the user's access to the second network, services available to the user, or a combination thereof.

25. The control device of claim 17, wherein the computer instructions are further translatable by the processor to determine whether the user has authenticated.

26. The control device of claim 25, wherein the user has not authenticated and wherein the computer instructions are further translatable by the processor to perform:
- redirecting the user to a login web page that requests user credentials; and
- using the user credentials received from the user to authenticate the user.

27. A control device for network access control, comprising:
- a processor;
- at least one computer-readable storage medium storing computer instructions translatable by the processor to perform:
  - receiving a packet originating from a user device in a first network, wherein the first network is connected to a second network via the control device, and wherein the user device is associated with a user;
  - determining whether the user has authenticated;
  - if the user has not authenticated:
    - redirecting the user to a login web page that requests user credentials; and
    - using the user credentials received from the user to authenticate the user;
  - processing the packet according to a plurality of stages, including a client discrimination stage and a user specific rule stage;
  - at the client discrimination stage, extracting information associated with the user device from a header of the packet and associating the packet with user specific traffic control rules and user specific firewall rules; and
  - at the user specific rule stage, accessing the user specific traffic control rules and user specific firewall rules based on the extracted information associated with the user device and applying the user specific traffic control rules and the user specific firewall rules to the packet as governed by at least one user specific class of service rule associated with the user on the user device in the first network.

* * * * *